(12) United States Patent
Zhou et al.

(10) Patent No.: US 10,635,752 B2
(45) Date of Patent: Apr. 28, 2020

(54) METHOD AND SYSTEM FOR CREATING INTERACTIVE INQUIRY AND ASSESSMENT BOTS

(71) Applicant: Juji, Inc., Saratoga, CA (US)

(72) Inventors: Michelle Xue Zhou, Saratoga, CA (US); Huahai Yang, San Jose, CA (US)

(73) Assignee: JUJI, INC., Saratoga, CA (US)

( * ) Notice: Subject to any disclaimer, the term of this patent is extended or adjusted under 35 U.S.C. 154(b) by 0 days.

(21) Appl. No.: 15/350,193

(22) Filed: Nov. 14, 2016

(65) Prior Publication Data
US 2017/0344532 A1  Nov. 30, 2017

Related U.S. Application Data

(60) Provisional application No. 62/342,543, filed on May 27, 2016.

(51) Int. Cl.
*G06F 17/27* (2006.01)
*G10L 15/00* (2013.01)
*G06F 17/28* (2006.01)

(52) U.S. Cl.
CPC ........ *G06F 17/279* (2013.01); *G06F 17/2881* (2013.01)

(58) Field of Classification Search
CPC ......... G06F 17/30448; G06F 17/30654; G06F 17/30976; G06F 17/27; G06F 9/4446
See application file for complete search history.

(56) References Cited

U.S. PATENT DOCUMENTS

| | | | |
|---|---|---|---|
| 7,987,151 B2 | 7/2011 | Schott et al. | |
| 2004/0153355 A1* | 8/2004 | Deering | G06Q 10/06393 705/7.39 |
| 2012/0071785 A1* | 3/2012 | Forbes | G06Q 30/02 600/558 |
| 2013/0026692 A1 | 1/2013 | Prins | |
| 2013/0266925 A1* | 10/2013 | Nunamaker, Jr. | G09B 7/00 434/362 |

(Continued)

OTHER PUBLICATIONS

Bickmore, Timothy et al., "Establishing the computer-patient working alliance in automated health behavior change interventions", Patient Education and Counseling, 2005, 59(1): 21-30.

(Continued)

*Primary Examiner* — Paras D Shah
(74) *Attorney, Agent, or Firm* — Pillsbury Winthrop Shaw Pittman LLP

(57) ABSTRACT

The present teaching relates to obtaining information from a user via a bot. In one example, a request is obtained to collect information in connection with a user. A statement is generated to be expressed to the user for facilitating a conversation between the user and the bot based on the request. Information is received in connection with the user and collected during the conversation. The collected information characterizes the user in a plurality of modalities. The collected information is automatically analyzed in the plurality of modalities to obtain an assessment of one or more human traits of the user. A plurality of result summaries are generated based on the assessment. The plurality of result summaries are provided in response to the request.

20 Claims, 14 Drawing Sheets

(56) References Cited

U.S. PATENT DOCUMENTS

| | | | | |
|---|---|---|---|---|
| 2014/0317030 A1* | 10/2014 | Shen | ................ | G06N 3/006 |
| | | | | 706/12 |
| 2015/0142532 A1* | 5/2015 | Reynolds | ......... | G06Q 10/06398 |
| | | | | 705/7.42 |
| 2015/0256528 A1* | 9/2015 | Turgeman | ............ | H04L 63/08 |
| | | | | 726/4 |
| 2015/0302436 A1* | 10/2015 | Reynolds | ........... | G06Q 30/0203 |
| | | | | 705/7.32 |
| 2016/0098397 A1* | 4/2016 | Doherty | ............. | G06F 16/93 |
| | | | | 707/769 |
| 2017/0053186 A1* | 2/2017 | Allen | ................ | G06K 9/6215 |
| 2017/0213190 A1* | 7/2017 | Hazan | ................ | G10L 25/63 |

OTHER PUBLICATIONS

Bouchet, Francois et al., Intelligent Agents with Personality: from Adjectives to Behavioral Schemes, In E. M. Alkhalifa & K. Gaid (Eds.), Cognitively Informed Interfaces: System Design and Development, 2012, 177-200. IGI Global.

International Search Report and Written Opinion dated Feb. 2, 2017 in International Application PCT/US2016/061959.

International Preliminary Report on Patentability dated Dec. 6, 2018 in International Application PCT/US2016/061959.

* cited by examiner

METHOD AND SYSTEM FOR CREATING INTERACTIVE INQUIRY AND ASSESSMENT BOTS

CROSS-REFERENCE TO RELATED APPLICATION

The present application claims priority to U.S. Patent Application No. 62/342,543, filed May 27, 2016, entitled "METHOD AND SYSTEM FOR CREATING INTERACTIVE INQUIRY AND ASSESSMENT BOTS," which is incorporated herein by reference in its entirety.

BACKGROUND

1. Technical Field

The present teaching relates to methods, systems, and programming for computerized bots for information gathering. Particularly, the present teaching is related to computerized bots for interactive communications.

2. Discussion of Technical Background

Many lines of businesses, ranging from Market Research to Healthcare to Human Capital Management, often use interviewing or surveying techniches to collect data from a target population and use the collected data to make various assessments.

One of the most used techniques is personal interviewing, where a human interviewer guides an interview/survey process in person or virtually (e.g., over the phone or web). While this approach is effective in data collection, it has several draw backs. One is its requirement of a human interviewer, which may be costly for a business if it is to interview hundreds of thousands of job applicants or customers. Moreover, the target population may not feel comfortable to disclose sensitive information due to the presence of a human interviewer.

An alternative, computer-based self-interviewing is used to achieve better efficiency and facilitate the collection of sensitive information. However, it is still far from being perfect, since humans may not be attentive due to a lack of engagement, not mentioning that humans are often inconsistent in their answers to inquiries.

Therefore, there is a need to develop novel techniques for making more efficient and effective inquiry and assessment to overcome the above drawbacks.

SUMMARY

The present teaching relates to methods, systems, and programming for computerized bots for information gathering. Particularly, the present teaching is related to computerized bots for interactive communications.

In one example, a method, implemented on a machine having at least one processor, storage, and a communication platform connected to a network for obtaining information from a user via a bot is disclosed. A request is obtained to collect information in connection with a user. A statement is generated to be expressed to the user for facilitating a conversation between the user and the bot based on the request. Information is received in connection with the user and collected during the conversation. The collected information characterizes the user in a plurality of modalities. The collected information is automatically analyzed in the plurality of modalities to obtain an assessment of one or more human traits of the user. A plurality of result summaries are generated based on the assessment. The plurality of result summaries are provided in response to the request.

In a different example, a system, having at least one processor, storage, and a communication platform connected to a network for obtaining information from a user via a bot is disclosed. The system comprises: a bot engine manager configured for obtaining and managing a request to collect information in connection with a user; a trait-based conversation facilitator configured generating a statement to be expressed to the user for facilitating a conversation between the user and the bot based on the request and receiving information in connection with the user, collected during the conversation, wherein the collected information characterizes the user in a plurality of modalities; and a multimodal assessor configured for automatically analyzing the collected information in the plurality of modalities to obtain an assessment of one or more human traits of the user, generating a plurality of result summaries based on the assessment, and providing the plurality of result summaries in response to the request.

Other concepts relate to software for implementing the present teaching on building a bot for obtaining information from a user via a bot. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a non-transitory machine-readable medium having information recorded thereon for obtaining information from a user via a bot is disclosed. The information, when read by the machine, causes the machine to perform the following: obtaining a request to collect information in connection with a user; generating a statement to be expressed to the user for facilitating a conversation between the user and the bot based on the request; receiving information in connection with the user, collected during the conversation, wherein the collected information characterizes the user in a plurality of modalities; automatically analyzing the collected information in the plurality of modalities to obtain an assessment of one or more human traits of the user; generating a plurality of result summaries based on the assessment; and providing the plurality of result summaries in response to the request.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
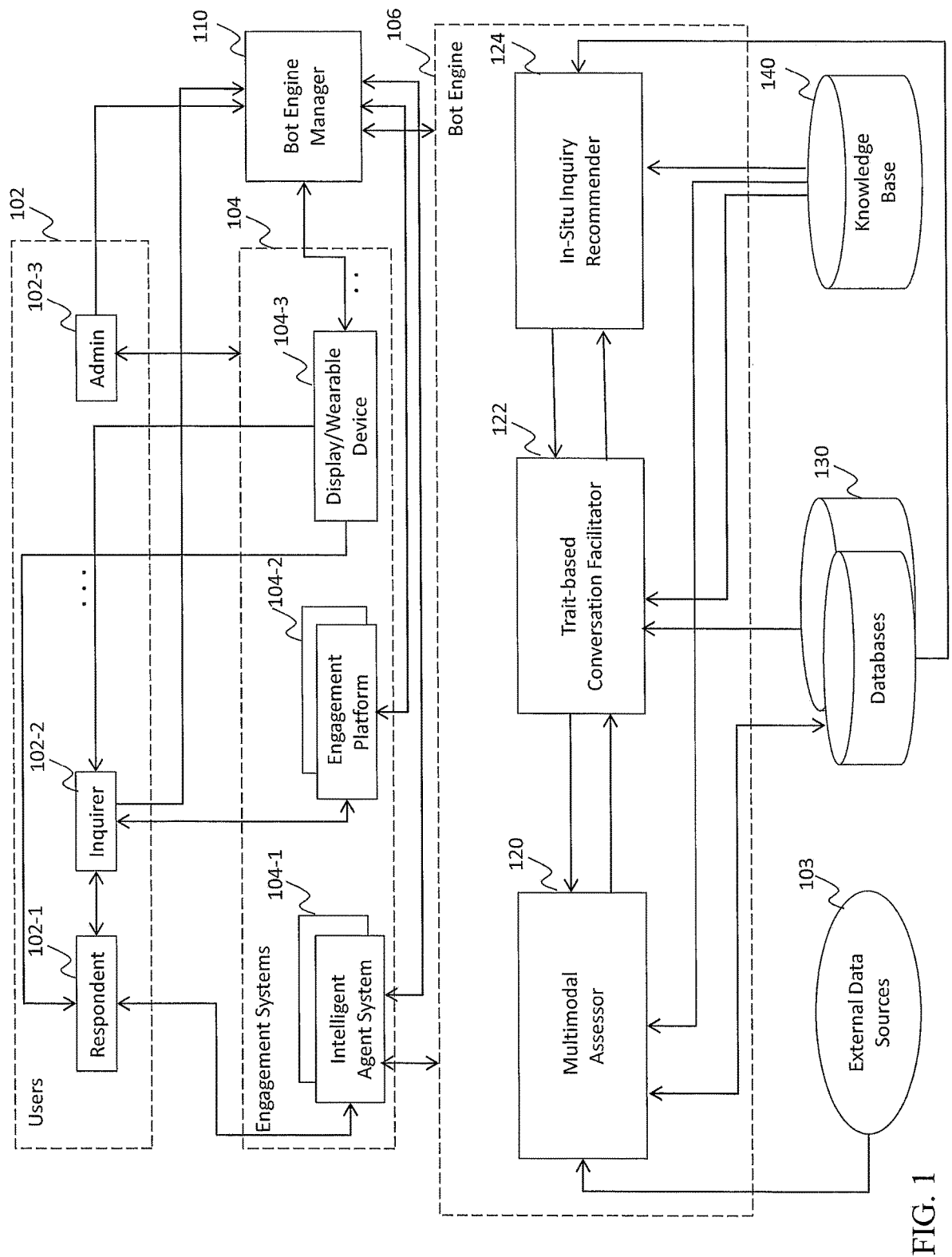
FIG. 1 illustrates an exemplary diagram of a bot engine, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of building a bot for performing interactive inquiry and assessment. We use the word bot to refer to an Artificial Intelligence (AI) agent, who is with or without a form (virtual or physical), and interacts with a person using one or more human-like communication means, for example, using a text-based chat or using a combination of voice, gesture, and facial expressions. In the present teaching, "bot", "robot", "intelligent agent", "AI agent", are used interchangeably.

Just like a personal interviewing during which a human interviewer interacts with a respondent and gathers information from the respondent, the present teaching discloses bot interviewing—the creation and use of a bot in place of a human interviewer to interact with one or more respondents and gathers information from the respondents. Moreover, the bot summarizes and analyzes the gathered information to provide a relevant assessment.

Typically, an "inquirer" creates a request of obtaining information and/or receives the collected information and/or assessment, while a "respondent" offers information and/or is being assessed. Moreover, both an inquirer and a respondent may be a natural person or a computer (e.g., another bot or a humanoid). For the purpose of understanding, below lists a set of exemplary bot interviewing scenarios. The role of an inquirer and the role of a respondent may also switch in the middle of their engagement. For example, during a workplace engagement among colleagues, one person may assume the role of an inquirer while another may be the respondent. They may however switch their roles, when the respondent becomes an inquirer and the inquirer becomes the respondent.

For example, a talent recruiter (inquirer) wants to assess a pool of job applicants (respondents) by three traits: diligence, reliability, and creativity. In this case, a bot interviews each applicant and automatically infers these three traits of each applicant using the information gathered during the interview. The bot also generates an assessment that ranks all the applicants by each of these traits. The recruiter can then use the assessment to decide the next best recruitment actions, such as recommending the most creative applicants to one organization, while suggesting the most reliable and diligent ones to another business unit.

Throughout this invention, we use the word "trait" to refer to any human characteristics, including one's innate qualities like personality and developed characteristics like skills, interests, and hobbies.

In another example, assume that a marketing researcher (inquirer) wishes to gather information about a new product from a group of potential customers (respondents). In this case, a bot interviews each potential customer, inquiring about their opinions of the product on one or more aspects, such as price and key features. As a result, the bot summarizes collected opinions, and automatically infers the characteristics of the respondents. For example, the assessment may indicate that conscientious and family-oriented customers are concerned about the quality of the product, while open-minded customers like certain features of the product.

In another example, a healthcare giver (inquirer) wishes to touch base daily with all her chronically ill patients (respondents) to track their status. In this case, a bot interviews each patient on a daily basis to inquire about the patient's status. By summarizing and analyzing the gathered information, the bot automatically produces a daily assessment that summarizes each patient's status, such as their emotional well-being and psychological needs, which will then help the caregiver determine the next best care actions for the patient.

Yet in another example, a recent college graduate wants to assess herself, such as personality, strengths, and interests. In this case, the inquirer and respondent is the same person, with whom a bot engages to conduct the assessment. Such an assessment can then be used to help the college graduate evaluate and determine her career choices.

Having a bot automatically interview a respondent has clear advantages over the existing personal or self interviewing methods. Just like self interviewing, bot interviewing scales out easily to conduct hundreds of thousands of interviews, even simultaneously. Similar to personal interviewing, bot interviewing keeps a respondent highly engaged and attentive via one-on-one interaction while still maintaining a private and objective setting that facilitates the collection of sensitive information without subjecting the respondent to potential human judgment or biases.

The approaches in the present teaching greatly improve the quality of data collection and/or assessment from several aspects. In particular, the approaches in the present teaching enable a bot to automatically make multimodal assessment of collected information to maximize the value of collected data and guide follow-on data collection. Such an assessment summarizes the collected content and infers the properties of the content (e.g., certainty and credibility of the content) based on respondents' interaction behavior (e.g., how quickly or firmly a respondent answered certain questions) and their unique traits (e.g., personality and motivations). The assessed properties of collected information can then be used to guide the follow-on interviewing. For example, if the certainty or reliability of collected data is inadequate, the bot may continue its interviewing with one or more respondents.

The approaches in the present teaching further enables a bot to automatically make multimodal assessment of a respondent's characteristics (e.g., personality) from one's behavior captured from multiple sources and/or multiple interaction modalities (e.g., the respondent's wording style, response speed, and attitude toward particular inquiries).

The approaches in the present teaching enables a bot to automatically make incremental assessment of a respondent by using the collected information during the course of its interaction with the respondent to update the respondent's characteristics.

The approaches in the present teaching enables a bot to dynamically adapt its inquiries to a respondent based on the characteristics of a respondent to further improve the quality of data collection by asking the right respondents the right questions. Using the above example of product marketing research, instead of asking the same set of questions to all respondents, the bot adapts its inquiries to each respondent based on their characteristics. For example, the bot will solicit price-related opinions from conscientious and frugal customers, while asking open-minded customers about their opinions on the product's unique features.

The approaches in the present teaching enables a bot to dynamically adapt its inquiries to a respondent based on the current assessment of the collected information and the assessment goals to ensure the quality of data collection. Using the above talent recruitment example, if a bot is still unsure of its assessment of an applicant's creativity, it may ask additional questions that help evaluate the applicant's creativity. Moreover, respondents' characteristics may be used to assess the properties of the information collected from the respondents. For example, the collected information may be considered more reliable if it is collected from conscientious and thoughtful respondents. In such a case, the bot may ask such respondents a fewer number of questions.

The approaches in the present teaching enables a bot to dynamically adapt its inquiries to a respondent based on the current state of the respondent to improve the quality of data collection by keeping the respondent stay engaged. Using the above healthcare example, if a bot detects the anxiety in a patient, it may use more lighthearted inquiries to help the patient relax before asking more serious questions.

The approaches in the present teaching enables a bot to automatically generate interaction expressions that reflect the bot's desirable human traits to improve the quality of data collection by keeping the respondent stay engaged. Using the above healthcare example again, a bot's interaction expressions with a patient may reflect warm and caring traits. This allows the bot to better engage with a respondent to collect intended information.

Since a bot can automatically and incrementally assess the characteristics of a respondent, it can also provide such information to a human interviewer in an interview process. Specifically, the human interviewer will be provided with a dynamic trait meter that dynamically monitors the traits of a respondent during an interview process. The trait information can then be used to guide the human interviewer in the process.

Since a bot can dynamically determine inquiries adapted to a specific situation during an interview, it can also recommend such inquiries to a human interviewer during her interview with a respondent.

Since a bot dynamically generate expressions that help engage a respondent, it can also recommend such expressions to a human interviewer to help her engagement with a respondent.

As a result, bot interviewing or bot-assisted interviewing provides a comprehensive and objective assessment of collected information, including the properties of the information and the traits of respondents. Moreover, the approaches in the present teaching that can automatically assess a respondent's characteristics during an interaction, automatically generate in-situ inquiries, and automatically generate trait-based interaction expressions are also applicable to any human-computer and/or human-human interaction, where such information may be used to augment such interactions.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 illustrates an exemplary diagram of a bot engine 106, according to an embodiment of the present teaching. Disclosed herein includes an improved process that uses one of three key functional modules alone or in combination to augment a human-computer or human-human interactive inquiry and assessment. As a result it improves the quality and efficiency of inquiry and assessment from one or more aspects, such as quality of collected data (collecting data from multiple modalities), assessment quality (knowing the respondents), and efficiency (asking the right questions at the right time based on the context).

FIG. 1 displays one of many embodiments of the bot engine 106 for implementing the disclosed improved process with the use of one or more of the three functional units to augment and improve one or more interactive inquiry and assessment systems. The three functional units are: (a) Multimodal Assessor 120, (b) Trait-based Conversation Facilitator 122, and (c) In-Situ Inquiry Recommender 124.

There are two main types of engagement, online or in person. In each case, there are many exemplary utilities of the invention to augment an engagement process, especially for the purpose for making inquiries and assessment. For any online engagement, one exemplary use of the present teaching is to create an inquiry and assessment bot embodied in an Intelligent Agent System 104-1 that has a Bot Engine 106. Module 104-1 may be an existing intelligent agent system that is augmented with such an engine for the purpose of making interactive inquiry and assessment. For example, an existing intelligent agent system may be an intelligent personal assistant, such as Google Now, Microsoft Cortana, and Amazon Echo, or an agent with a specific purpose, such as Mezi and Kip for shopping or Imperson's Miss Piggy for entertainment.

An inquirer first specifies an assessment task, with one or more assessment goals through the Bot Engine Manager 110. A typical assessment task includes information, such as the type of assessment, inquiries to be made, and one or more assessment goals to be achieved. Using the above talent recruitment example, the task of assessing the job applicants may be described as follows: "assessmentType"="respondent", "inquiries"=[ . . . ], "assessmentGoals"=[ . . . ].

An assessment goal more specifically defines what is to be assessed and the criteria for acceptable assessments. For example, one of assessment goals for the talent recruitment is to assess a respondent's diligence and it requires the assessment to reach a minimal level of confidence of 0.8: "traitName"="diligence", "confidence">=0.8.

After an assessment task is defined and submitted, the Bot Engine Manager 110 informs the Intelligent Agent System 104-1, which then triggers the Bot Engine 106 as soon as a respondent 102-1 logs onto 104-1. The Trait-based Conversation Facilitator 122 is first called to start the engagement with the respondent. If the respondent logs in with a third-party account, such as Facebook or Twitter, the Multimodal Assessor 120 is called to automatically analyze the respondent's data stored in the external data sources 103 and uses the knowledge base 140 to make an initial assessment of the respondent by inferring his/her characteristics. The initial assessment is stored in the database 130.

As part of the expression generation process, it may call the In-Situ Inquiry Recommender 124 to automatically generate an initial inquiry using the database 130 and the knowledge base 140. The inquiry is then communicated to the respondent through the Intelligent Agent System 104-1. After the respondent receives and responds to the inquiry, the Trait-based Conversation Facilitator is called again to start another round of interaction or inquiry. The inquirer 102-2 can directly interact with the Bot Engine Manager 110, which then interacts with the Bot Engine 106 to obtain intermediate assessment results and/or instruct the inquiry process.

Another exemplary use of present teaching is to augment an existing engagement platform 104-2 with a Bot Engine 106 and a Bot Engine Manager. Typically, an engagement platform 104-2 engages with two or more users 102-1, 102-2. Such a platform may be a social networking system, such as Facebook, LinkedIn, and Twitter, or a messaging system like Slack, Facebook Messenger, and WeChat. Another type of engagement platform may be a content provider, such as Yelp, Medium, and Reddit, where users engage with one another via reviews and commenting. Yet another type of engagement platform is for interactive services, such as messaging systems that allow customers to text and/or speak with a customer representative, to make purchases or report problems.

With the augmentation, an inquirer of an engagement platform 104-2 specifies one or more assessment tasks via the Bot Engine Manager 110. Through the bot engine manager, the Bot Engine 106 helps the inquirer gain access to the incremental assessment results (Multimodal Assessor 120), choose the right inquiries in context (In-Situ Inquiry Recommender 124), and/or compose tailored expressions (Trait-based Conversation Facilitator 122).

In addition to online engagement, another exemplary use of our present teaching is the support of in-person inquiry and assessment. One exemplary utility is where two or more users are on an engagement platform 104-2, which may be installed on the users' cell phone. When they engage with one another face-to-face, the incremental assessment results, the in-situ inquiries, or the proper conversation expressions may be recommended by the Bot Engine 106 and shown on various displays 104-3, such as a projected display and a wearable device. Depending on the context, a user may use the bot-recommended information (e.g., inquiries or expressions) to further probe specific aspects of another user or gracefully end their conversation.

Another exemplary utility of our present teaching is to allow an inquirer 102-2 to obtain the overall assessment results. An inquirer accesses such results through the Bot Engine Manager 110, which will then call the Bot Engine 106. As illustrated in earlier examples, if an inquirer is a talent recruiter, s/he may want to view all the job applicants by the assessed traits, while a marketing researcher may want to view summarized customer opinions along with the characteristics of these customers.

Another exemplary utility of our present teaching is to allow system administrators 102-3 to interact with the Bot Engine Manager 110 to manage the assessment results periodically or at one time, as well as perform bot configuration. For example, an admin for a marketing research company may want to update their customer assessment periodically by pulling external data 103 or activating a bot to conduct inquiry and assessment. An admin may also configure bots with different personality for different assessment tasks.

Figure 2:
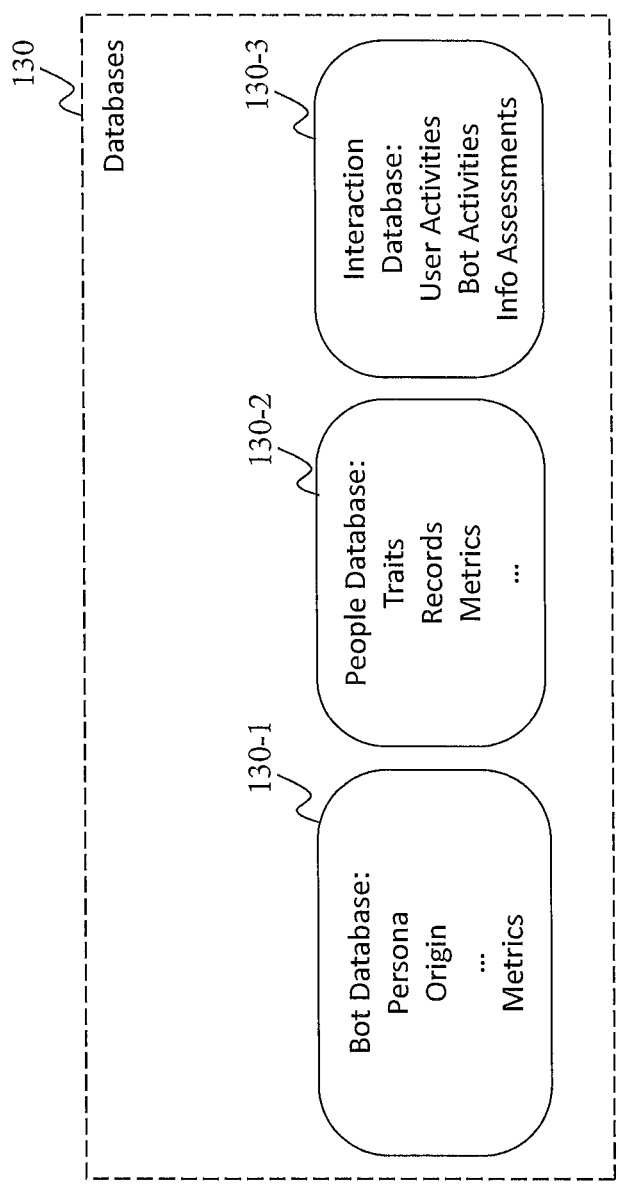
FIG. 2 illustrates content in databases, according to an embodiment of the present teaching.

FIG. 2 illustrates content in databases used to support interactive inquiry and assessment, according to an embodiment of the present teaching. FIG. 2 shows information stored in the databases 130. It may also include a bot database 130-1, which captures one or more pieces of information about a bot, including given persona, origin (the real person modeled after), and metrics that measure the bot performance. It may include a people database 130-2 that contains information about each user of an engagement system such as his/her traits, records (e.g., how many times the person has participated in a bot interviewing and whether s/he gets paid), as well as the metrics used to gauge the person's performance in such an interview. It may also include an interaction database that records all user and bot activities including their interactions with one another. The interaction database also records information assessment results, which are generated during the course of an inquiry process as described later.

Figure 3:
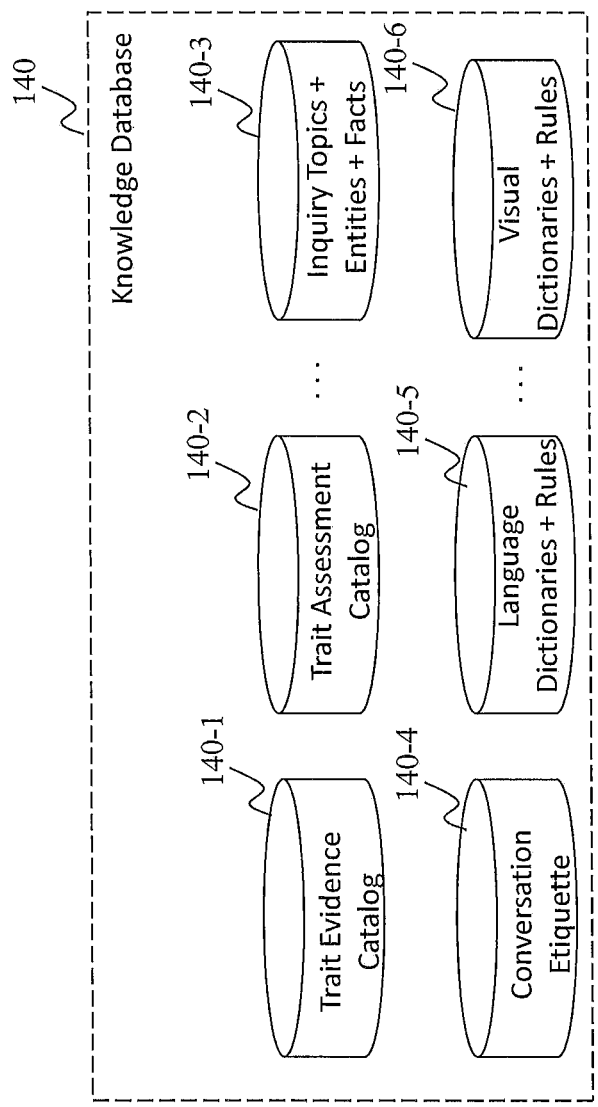
FIG. 3 illustrates content in a knowledge database, according to an embodiment of the present teaching.

FIG. 3 illustrates content in a knowledge database, according to an embodiment of the present teaching. FIG. 3 shows the elements in the knowledge base 140. The use of these elements (e.g., Trait Evidence Catalog 140-1) will be described in context below.

Figure 4:
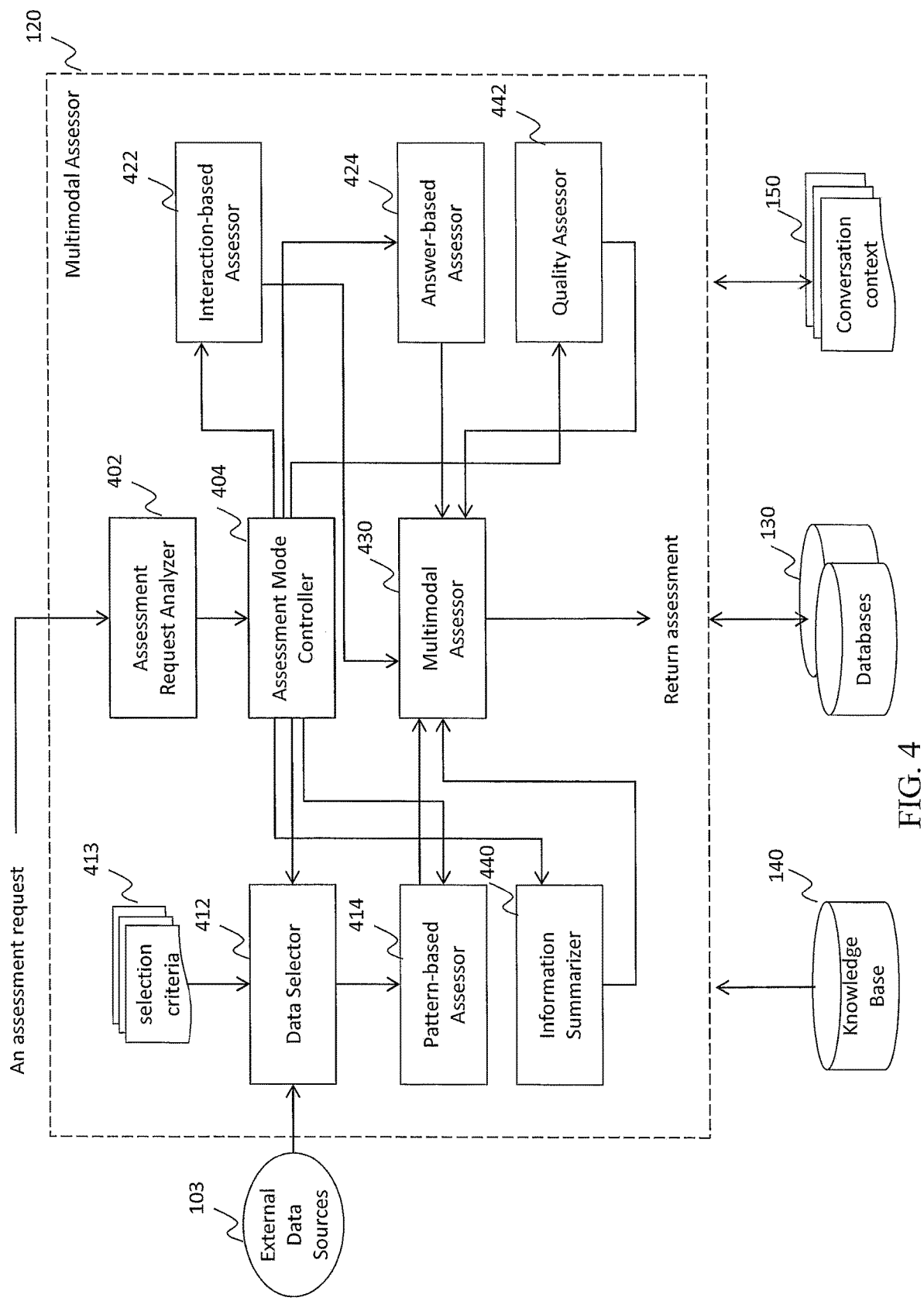
FIG. 4 illustrates an exemplary diagram of a Multimodal Assessor, according to an embodiment of the present teaching.

FIG. 4 illustrates an exemplary diagram of a Multimodal Assessor 120, according to an embodiment of the present teaching. This module aims at making a comprehensive assessment of information collected during a bot interviewing process from multiple sources and multiple modalities. Overall, it may support two types of assessment: (a) respondent assessment that assesses the characteristics and qualities of one or more respondents, and (b) information assessment that is to summarize the information collected from respondents and evaluate the quality of such information.

FIG. 4 illustrates one of many structural embodiments for constructing a Multimodal Assessor with one or more key components. Although by no means the exemplary structural configuration of the components has exhausted all configuration variants, which may achieve the same or similar effects of facilitating an interactive inquiry and assessment process.

As shown in FIG. 4, given an assessment request, the request analyzer processes the request 402. During this analysis, it extracts various parameters of the request, such as the type of request, and sends such information to the controller 404. Depending on the type of request, the controller 404 calls the corresponding component to make different assessments. For a respondent assessment, there may be three key methods to be used: (i) pattern-based assessment, (ii) interaction-based assessment, and (iii) answer-based assessment.

A pattern-based assessment analyzes one's activities in general to extract patterns, such as one's word use or image-like patterns, and then automatically infers the person's characteristics. The main advantage of using a pattern-based approach is its generality, as it focuses on the abstracted patterns, such as the frequency of using certain words/phrases or punctuations in one's write-up, instead of specific activities or content. Since such patterns may be observed across context, e.g., from one's Yelp review to Facebook posts, it helps automatically infer a person's persistent, enduring traits, such as personality and strengths.

In the present teaching, one type of user activities used for pattern-based assessment may be external to the inquiry process and volunteered by a respondent, such as one's Facebook posts, likes, and sharing activities, or related third-party activities, such as the comments and endorsements by friends, colleagues, or even rivals. In this case, module 412 is first called to determine the proper data sources to be used based on one or more criteria 413, such as data availability, data quality, and context relevance. This step helps ensure the assessment quality, since a person's activities may be or may not be related to an assessment task. For example, one's activities on a professional networking site like LinkedIn, may be less related to the marketing research task mentioned earlier than it is to the talent recruitment interview.

Once the data sources are selected, the pattern-based assessor 414 automatically analyzes the patterns in the data and infers a set of human characteristics. If multiple data sources are used, the assessor also consolidates the results derived from data sources. Besides analyzing user activities external to an interactive inquiry process, module 414 may also be called directly by the controller 404 to analyze the patterns in one's activities exhibited during the inquiry, such as one's word use patterns in the responses and response tempo. This step is especially useful if there are not sufficient external activities to be analyzed.

In addition to assessing one's unique, enduring qualities from one's activity patterns, the present teaching evaluates one's state-of-mind based on their interaction behavior related to a specific inquiry or interaction. For example, how quickly or firmly a person responds to an inquiry may signal one's level of confidence in his/her answer to that inquiry. To automatically assess one or more traits of a respondent related to a specific inquiry, the interaction-based assessor 422 is called. This differentiates the present teaching from existing self interviewing (e.g., online surveys using Survey Monkey), which does not capture respondents' interaction behavior, let alone using it to assess the respondent's characteristics at every turn of inquiry.

Since both pattern-based and interaction-based respondent assessments rely on a certain level of machine intelligence, which is far from being perfect, the present teaching discloses yet another assessment method: answer-based assessment. This is similar to traditional psychometric testing, where questionnaires are used to gauge one's psychometrics. However, unlike a traditional, self-administered psychometric test, in the present teaching a bot introduces psychometric questions during its interaction with a respondent. The respondent may not know which questions are psychometric questions and hopefully will provide truthful answers to such questions. The answers are then used to assess respondents' corresponding psychometrics in module 424.

In addition to assessing a respondent, the second type of assessment is to evaluate the collected information, such as customer opinions collected on a particular product or patient input collected on a particular day. This type of assessment may include two main types of analysis: information summarization and information quality assessment. Specifically, an information summarizer 440 automatically analyzes the collected information—user responses, and generates a summary based on one or more assessment goals, such as creating a topic summary or an opinion summary. On the other hand, a quality assessor 442 assesses the quality of collected information from a number of aspects, such as the consistency and reliability of the information. As described below, it may use the respondents' characteristics, such as conscientiousness, to assess the quality of collected information.

No matter which method is used to assess a respondent or the collected information, all assessment results are then sent to the multimodal assessor 430 to produce the combined assessment results. The assessment results, such as the discovered traits of respondents, may be recorded in the databases 130. The results are also returned to the module that requests the assessment. Module 120 is connected to the knowledge base 140 and the conversation context 150, which provide information for many sub-modules to make inferences during a user-bot conversation.

Figure 5:
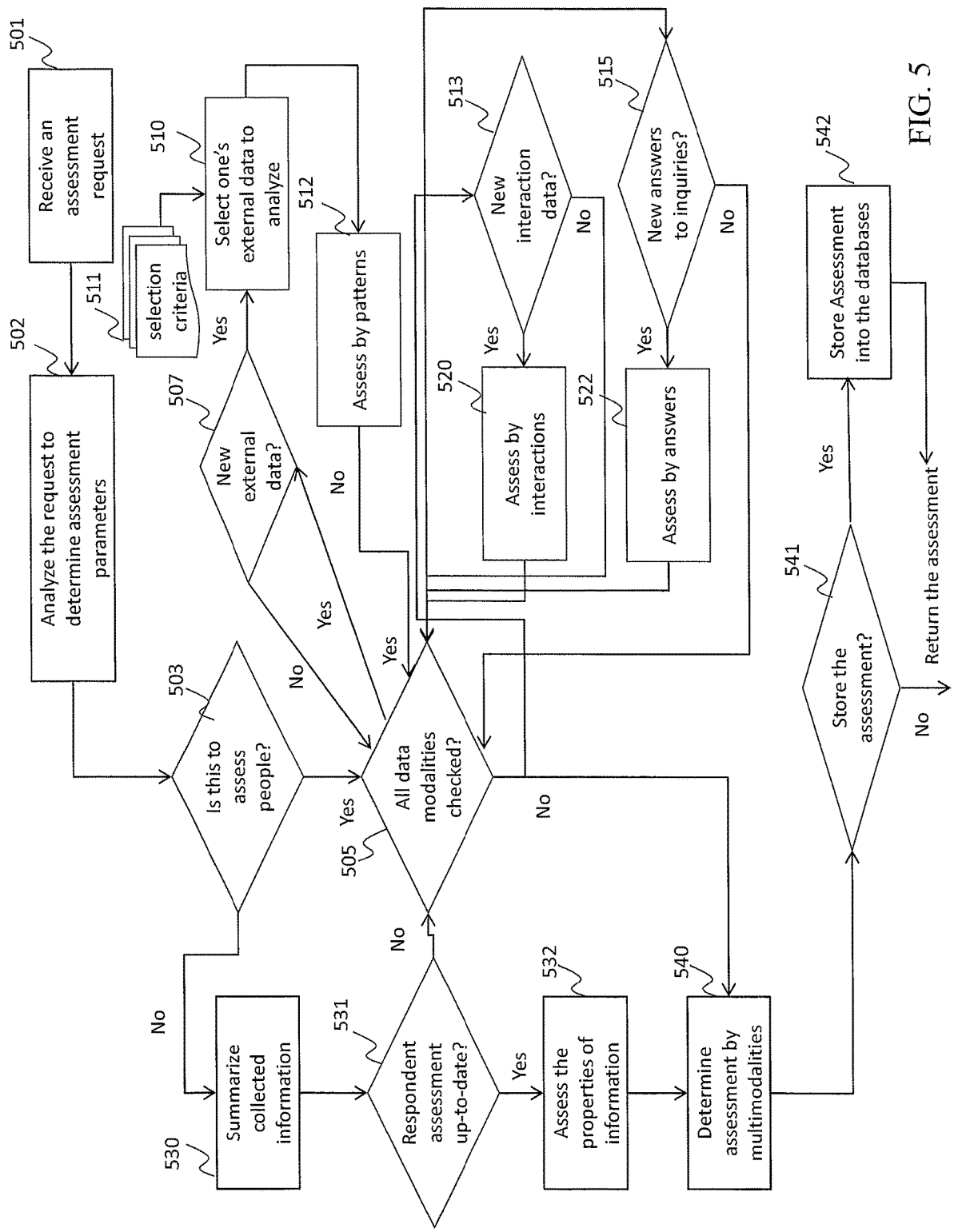
FIG. 5 shows a flowchart of an exemplary process performed by a Multimodal Assessor, according to an embodiment of the present teaching.

FIG. 5 shows a flowchart of an exemplary process performed by a Multimodal Assessor 120, according to an embodiment of the present teaching. As shown in FIG. 5, the process flow of making a requested assessment starts with an assessment request received at 501. Such a request is first analyzed at 502 to extract various assessment parameters. If the request is to assess people (respondents) determined at 503, module 505 is then called to check the availability of all suitable data to be used for making such an assessment.

Module 507 may be first called to determine the availability of new external data related to a person being assessed. Since a person's external activities may be captured in one or more data sources, step 510 is to determine the data sources to be used based on one or more criteria, such as data availability, data quality, and context relevance 511. A simplest approach is by data availability: using whatever available data sources opt-in by a user. If two or more data sources are provided (e.g., Facebook and LinkedIn), the data from these sources may be simply combined for analysis. To ensure the quality of operations, more preferably, this step should select only suitable data sources to use. First, different assessment tasks may require different data. Assuming that the task is to assess a pool of job applicants mentioned earlier. LinkedIn may be a more proper data source than Instagram, as it reflects one's professional life. In contrast, if the task is to assess respondents and their product opinions in the marketing research scenario mentioned earlier, Instagram may be a more suitable source. Moreover, data quality may vary in different sources, which directly impacts the quality of respondent assessment. Data quality may be determined by one or more criteria, such as density (how much behavior is captured), distribution (all the behavior occurs at once or distributed over a long period of time), and diversity (how diverse the captured behavior is). Since it is easier for someone to fake low quality data (e.g., faking behavior at one shot vs. over an extended period of time), this criterion may also help detect and prevent the faking of personas.

By the data selection criteria, one of many methods or in their combination may be used to determine the data sources. One exemplary method is to first let a respondent interactively specify one or more data sources. The system then evaluates the volunteered data sources and decides which ones to use by the selection criteria. Another exemplary method is to let a system select one or more qualified data sources by a set of criteria, and then prompts a respondent to provide the data (e.g., via Facebook login). In this approach, all possible data sources are stored in a knowledge base and associated with a set of descriptors, e.g., <Instagram, personal, 0.8>, <LinkedIn, professional, 0.5>. These descriptors indicate that Instagram may be a good data source to use if it will be used to characterize one's personal aspects and the projected data quality at 0.8. Otherwise, LinkedIn may be a better source for professional purpose and the estimated data quality at 0.5.

Besides using one's external activities, the data selector may use one's response data generated during an interactive inquiry process, such as one's response content to inquiries and response tempo. Such data may be kept in the conversation context 150.

After determining what data to use, the next step 512 is to determine whether the selected data sources be merged first before assessment or simply assess each data source and then merge the assessment results. One exemplary method is to simply combine one's external and response data first before assessing it. This is especially valuable when one's external data is insufficient for analysis. One's response data also grows as the inquiry process unfolds and thus enables a person (respondent) to be assessed incrementally to improve the quality of respondent assessment over time. Another exemplary approach is to merge data from similar sources, such as Facebook and Snapchat, since both capture one's online social networking activities.

Alternatively, an exemplary approach is to derive one's characteristics from the data at 512. Depending on the type of data (e.g., likes vs. write-ups), different inference engines may be used to derive human traits. One exemplary inference engine is to use a lexicon-based approach to analyze textual data and derive human traits. Such an engine, replies on a Trait Evidence Catalog 140-1 (FIG. 3), which defines the weighted relationship between a text term, such as "happy new year", and a particular trait, e.g., openness, with a weight, say 1.3. Such text-based evidence catalog may be constructed based on numerous studies in Psycholinguistics that indicate the relationships between words and human traits (e.g., Yarkoni 2010). The inference engine then takes a person's textual footprints (e.g., reviews, blogs, and emails) and counts the frequencies of each word appearing in the text-based evidence catalog. The counts are often normalized to handle text input with different lengths. For each trait t, it then computes an overall score S by taking into account all M words that have relationships with t in the text-based evidence catalog:

$$S(t) = C(word_1) * w_1 + C(word_2) * w_2 + \ldots + C(word_M) * w_M \quad (1)$$

Here $C(word_i)$ is the normalized count of $word_i$ in the input and $w_i$ is its weight associated with trait t.

Another exemplary inference engine is to use a rule-based approach to infer one or more human traits. For example, the number of questions that a respondent poses during an interview may indicate the respondent's inquisitiveness. To support such inferences, the first step is to collect normative data that captures the average user behavior over a random, large population. One exemplary approach is to count the average number of questions asked per candidate from a large number of interview transcripts. Inference rules can then be constructed to score one's traits by comparing one's behavior against the normative data. For example, it may consider one's inquisitiveness high if the number of questions asked by this person exceeds the average by two standard deviations. Such inference rules may be stored in the Trait Evidence Catalog 140-1 in the knowledge base 140 (FIG. 3).

Just like any other data analysis engines, the quality of the data or the analytic algorithms themselves is hardly perfect. To assess the quality of a derived trait score, quality metrics are also computed. There may be two most important quality metrics in deriving a human trait score: reliability and validity. Reliability measures how consistent or stable the derived results are, while validity evaluates the correctness or accuracy of the derived results. There are many ways to compute the reliability. One exemplary implementation of computing reliability is to use each person's different sample data sets (e.g., random samples of one's all Facebook status updates) to derive the traits and examine how stable the results are.

Although there are many methods for measuring validity, validating the correctness of the results takes time. For example, assessing whether a person is detailed-oriented, one method is to log a user's behavior (e.g., paying attention to minute details) that may be used as a positive or negative evidence to validate such a trait. Over time, a validity score may be computed based on the prediction power of a trait on the corresponding behavior. The relationships between a user's behavior and a trait may be recorded in the Trait Evidence Catalog 104-1, which is then used to help infer as well as validate the trait by relevant evidences.

As described above, one or more data sources may be used in deriving one's human traits. Moreover, one or more types of data may exist in a single data source, each of which is used to derive a set of traits. For example, one's Facebook data source may include three types of data: likes, status updates, and profile. Step 512 thus also consolidates derived traits based on one or more criteria, such as data type, data source, trait type, and trait quality.

One exemplary implementation is to merge the same type of traits derived from different data (e.g., Facebook likes and status updates) in a single data source (e.g., Facebook) by taking the mean or average of the trait scores if the scores are similar enough. However, if the differences are too great (e.g., exceeding 3× standard deviation), the confidence score associated with each trait may be used to determine which ones to keep since such confidence score measures the quality of a computed trait score.

Another exemplary method is to preserve/merge trait scores by trait type. Suppose that a set of traits $<t_1, \ldots t_K>$ is derived from one's Facebook activities, while another set $<t'_1, \ldots t'_K>$ is derived from one's response data. The consolidation merges the enduring traits (e.g., extroversion) derived from both data sources, while keeping the adopted traits (e.g., openness) derived from the response data. The trait type may be determined in advance and stored in the knowledge base to indicate which traits are enduring and which ones are adopted and malleable. This method ensures the quality of assessment because a trait may be context-sensitive (e.g., one's openness may depend on a particular context), and we want to assess a person's character in the most relevant context(s).

After the consolidation, if a person is still associated with two or more sets of derived traits, one primary set of traits may then be determined by using one or more heuristics. One exemplary heuristic is to include only the traits with acceptable reliability (e.g., Cronbach's alpha>0.8) and/or validity measures (e.g., validity>0.7). Another heuristic is to consider only traits that matter to the current assessment task, which can be defined by an inquirer or by default.

The inferred traits are then stored temporarily before being sent to a multimodal assessor for further process at 530. In the current flow, it goes back to check the availability of additional data modalities at 505. It calls 513 to determine whether new interaction data is available. Such interaction data may capture a respondent's behavior during a specific interaction or interaction sequence, such as the respondent's response time to an inquiry, response length, and response content.

The interaction data is then used to infer the characteristics of a respondent to a specific interaction situation at step 520. Unlike a respondent's characteristics inferred at step 512, which characterizes the respondent in general, step 520 derives the respondent's local traits related to a particular interaction situation, such as the respondent's confidence, thoughtfulness, and attitude toward a particular inquiry or topic.

One exemplary approach to infer a respondent's traits to a specific situation is a rule-based approach, where one or more rules define the relationships between user behavior and a trait. For example, one rule may specify that one's response time and response length together indicate one's interest in an inquiry. The faster the response time is and the longer the response is, the higher the interest. Another exemplary approach to infer a respondent's local traits is a lexicon-based approach that is used to analyze one's general traits described earlier. Such an approach analyzes the text of response content and infers corresponding traits. For example, the frequent use of certain words may signal one's confidence or thoughtfulness in the response. The same method may also be used to gauge one's attitude toward a particular inquiry/topic. For example, the frequent use of negative or positive expressions may signal a respondent's negative or positive attitude. The Trait Evidence Catalog 140-1 is used to indicate the relationships between text terms and traits. The inferred local traits are then stored temporarily before being sent to a multimodal assessor for further process at 530.

The current flow continues by calling 515 to determine whether new answers are available for assessment. While both steps 512 and 520 rely on certain level of machine intelligence to assess a respondent, step 522 assesses a respondent based on his/her explicit answers to a question. For example, step 520 may not be able to accurately infer one's confidence in his/her response just by analyzing the response itself, the bot may ask the person directly "How confident are you in your answer? Please rate it on the scale of 1 to 5, 1 being not confident at all, 5 being highly confident." Similarly, the bot may use questions to gauge a person's general traits. For example, if the bot wants to assess a person's aesthetic interest, it may ask the person "How much do you love flowers? Please rate it on the scale of 1 to 5, 1 being not all, 5 being very much."

Step 522 provides another modality of character assessment—questionnaire-based assessment—in addition to inferring one's traits automatically from data. One exemplary approach for deriving a trait score based on one's answers is similar to a typical psychometric testing. Using the above example, if a user's answer to "How much do you love flowers" is 3, his trait score for aesthetic interest in this question is 3. Such a score is added together with other answer-based scores obtained for this trait. A relative score is also computed based on a normative score. Each trait assessed based on answers is also associated with a reliability and/or validity score, which may be obtained in published psychometric studies. In the present teaching, such information is stored in the Trait Assessment Catalog 140-2 in the knowledge base 140. The assessment results are then further processed at step 530.

Step 530 is to integrate the two or more sets of derived human traits. For example, step 512 may infer one set of human traits based on data patterns, while step 522 may produce one or more human traits from one's answers to trait-based assessment questions. Moreover, when one generates new data, the newly derived traits based on the new data need to be integrated with those already stored in the databases. To integrate two or more sets of traits, the approaches in the present teaching described below first merges two sets of traits. The approach may be repeated as needed to merge all the trait sets.

Although there are many simple implementations to integrate two trait sets together, a more preferable approach is to use the quality of derived traits to guide the integration and resolve conflicts. One such exemplary implementation starts with the set that has a smaller number of traits derived and integrates each trait in this set into the bigger set. When integrating trait $t_s$ in the smaller set into the bigger set, there are two situations: (i) if there is no corresponding trait $t_b$ in the bigger set add $t_s$ into the bigger set; (ii) otherwise, integrate $t_s$ and $t_b$. In their integration, if these two traits have similar scores (e.g., within a threshold), an average of the two may be used. On the other hand, if the disparity between the two trait scores is too big (e.g., exceeding 3× standard deviation), it then checks the confidence score associated with each trait score. For data-derived traits, the confidence score may be its reliability score or validity score (if exists) explained in 512, while for answer-based traits, the confidence score is their published reliability or validity score. If only one of the confidence score exceeds a threshold, its related trait score is then kept. However, if both confidence scores are either below or above the threshold, both trait scores are kept but with a conflicting flag attached. A conflict flag will not be taken down until the conflicts are resolved, e.g., trait scores or their associated confidence scores are changed in the future due to new input, such as answers to new questions.

If the assessment request is to assess the information collected, step 530 is called to analyze and summarize the collected information. The type of analysis or summarization may be determined by the assessment request or by default. For example, topic analysis may be a default analysis to perform if the collected data is free text. Such analysis may use a wide range of existing text analytics approaches, ranging from very simple to sophisticated approaches. For example, one topic analysis may use a simple tf-idf based approach to extract a set of text terms first, and then cluster the extracted terms together to identify the topics. A more sophisticated topic analysis may use a Latent Dirichlet Allocation (LDA) based approach that automatically extracts a number of topics. If the collected data is opinions in free text, opinion analysis may be performed as a default operation to summarize the collected data. Similar to topic summarization, there are many existing opinion summarization methods (see Liu 2012).

After summarizing the collected information, the next step is to assess one or more properties of such information, such as data quality, data volume, and distribution. Since the properties of collected information may depend on the respondents who provide such information, it first checks whether the respondent assessment is up to date at step 531. If it is not, it invokes the steps described above to obtain an updated assessment of the respondents. Otherwise, step 532 is called to assess the one or more properties of collected information.

One function at this step is to measure the quality of collected information, which may be measured in one or many ways. One exemplary approach is to measure data quality based on the respondents' general characteristics such as trustworthiness derived at step 512. For example, the data quality is higher, if the respondents are considered trustworthy. Another exemplary approach is to assess the data quality based on the respondents' local traits inferred at step 520. The data quality is considered better, if the respondents are more confident when they provided such data. Overall, the measuring of data quality q may be expressed as follows: $q=\Sigma_1^M w_j \times \Sigma_1^N t_{ij}$. Here $w_j$ is the weight for jth trait that impacts the data quality, $t_{ij}$ is the jth trait score of the ith respondent, M is the number of traits, and N is the number of respondents who provided the data.

Besides assessing data quality, it may also assess other data properties based on assessment goals. For example, one goal may require that it collect a certain amount of data, while another may require such data to conform to a particular distribution. The assessed properties of information are then merged with the information summaries at Step 540 to form complete assessment results, which may also include detailed information or summary about the associated respondents. No matter whether an assessment is about the respondents or the information they provided, step 541 is called to check whether the assessment results need to be stored. Step 542 stores the assessment results in the databases 130.

Figure 6:
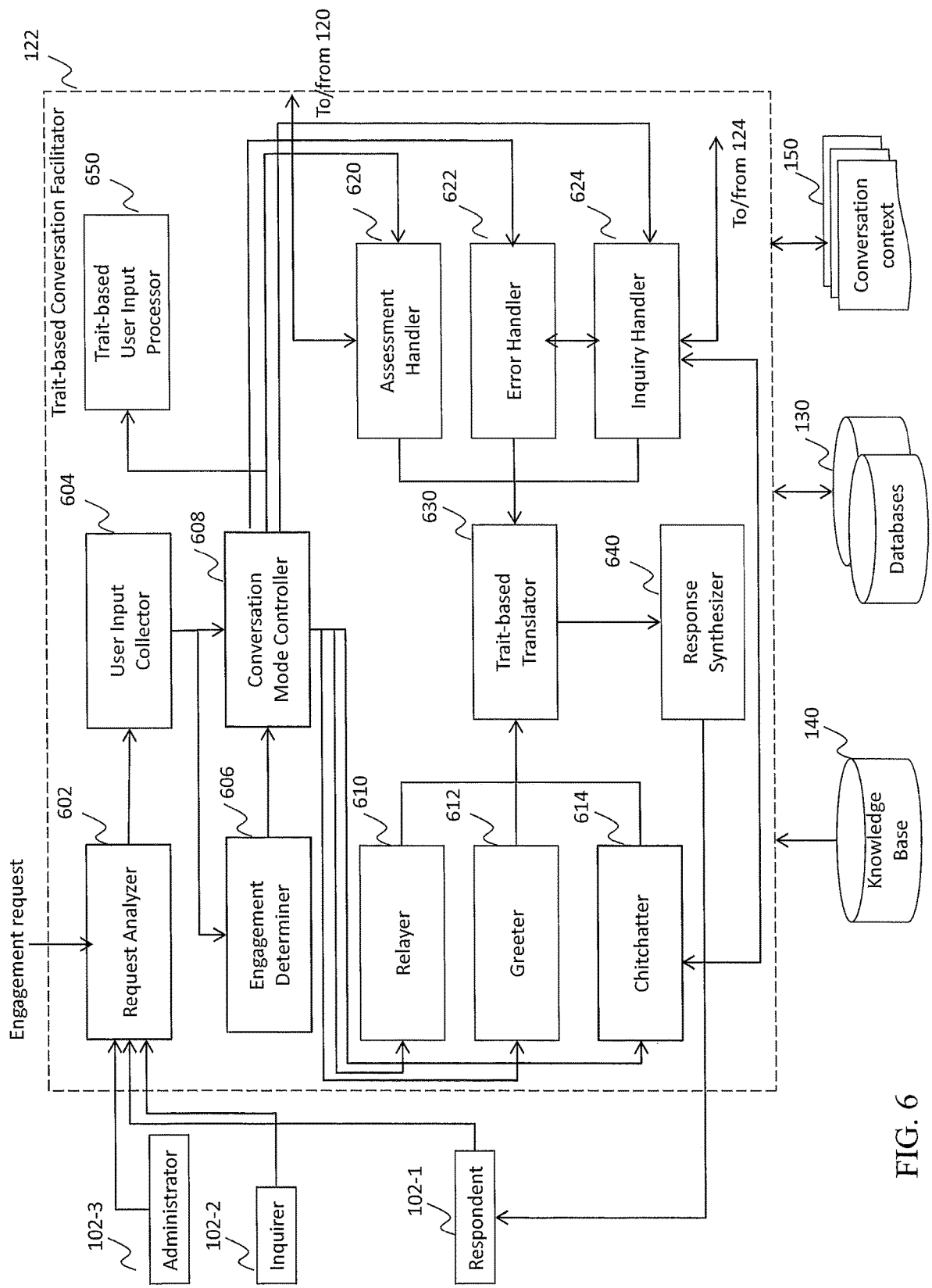
FIG. 6 illustrates an exemplary diagram of a Trait-based Conversation Facilitator, according to an embodiment of the present teaching.

FIG. 6 illustrates an exemplary diagram of a Trait-based Conversation Facilitator 122, according to an embodiment of the present teaching. The goal of module 122 is to generate one or more expressions for a bot to engage with a respondent during an interactive inquiry process. Such expressions are often context sensitive to ensure the most effective engagement. For example, if the bot is not able to interpret a respondent's input, it must handle such a situation gracefully. Moreover, a bot may want to communicate with a respondent in a more natural and pleasant manner by generating expressions more human-like, with certain personalities and characteristics.

FIG. 6 captures one of many structural embodiments for constructing an Trait-based Conversation Facilitator with one or more key components, although by no means the exemplary structural configuration of the components has exhausted all configuration variants, which may achieve the same or similar effects of facilitating an interactive inquiry and assessment process.

As shown in FIG. 6, the input to module 122 is an engagement request. Such a request may be explicitly submitted by a user or automatically generated by a system. For example, a human inquirer 102-2 or administrator 102-3 may send an intervention request so they can interact with a respondent directly (see later on how a human inquirer may want to hijack a conversation flow). In another example, a respondent 102-1 may trigger a "Start Conversation" request by typing the first message in a chat window, while a system may issue an "End Conversation" request when a time limit is reached. Given such a request, the request analyzer 602 processes the request to create an engagement task. The user input collector 604 is then called to collect the current user input if there is any. The collected user input and the engagement task are then sent to the engagement determiner 606, which suggests one or more engagement acts. For example, in the case of human intervention, it creates one engagement act: relaying the message from a human inquirer or administrator to a respondent directly. To start an engagement, on the other hand, it may suggest two acts: saying hello and asking the user an initial inquiry. The engagement acts are then sent to a controller 608 to be dispatched.

Depending on the engagement acts, module 608 decides which module(s) to invoke to execute each engagement act. In the present teaching, there are six exemplary modules that may be used by alone or in combinations to generate engagement expressions for different engagement tasks. Specifically, the relayer 610 simply relays a message, which is often provided by a human; while the greeter 612 generates greeting expressions when a bot first meets a user or farewell expressions when the bot ends the engagement. The chitchatter 614 generates various expressions for the bot to keep the conversation going. The assessment handler 620 handles a user's assessment request and generates corresponding expressions to convey the assessment results that may be returned by Module 120. The error handler 622 takes care of various erroneous situations and generates corresponding expressions to explain the situation and move the engagement forward. The inquiry handler 624 handles the generation of various inquiries in an engagement. It may also call the In-Situ Inquiry Recommender 124 to generate specific inquiries. If the chitchatter 614 decides to use a question for chitchat, it may call the inquiry handler 624 to generate such a question.

The engagement expressions generated by one or more these modules may be sent to the trait-based translator 630 to be translated into expressions that project certain human characteristics. For example, a chitchat expression may be translated into an expression that conveys similar meaning but projects a warm, friendly personality. In another example, an error handling expression may be translated into an expression that uses a particular wording style with a humorous personality. One or more translated expressions are then sent to the response synthesizer 640 to be synthesized. Moreover, engagement expressions may include non-verbal expressions, such as a visualization that communicates one's personality assessment results or facial expressions and gestures of an avatar—one or many bot embodiments.

The synthesized expressions are then sent to the respondent to continue the engagement. This module uses the databases 130, the knowledge base 140, and the conversation context 150 to complete its functions. It may also update the databases and the conversation context during the process.

Besides the six exemplary modules that handle various communication acts, another module 650 processes a user's current input when the input is intended to be interpreted and further processed. For example, if a user's input is meant to answer a bot inquiry, as described later in more details, this step examines the answer and determines whether the answer should be kept for assessment or reuse.

Figure 7:
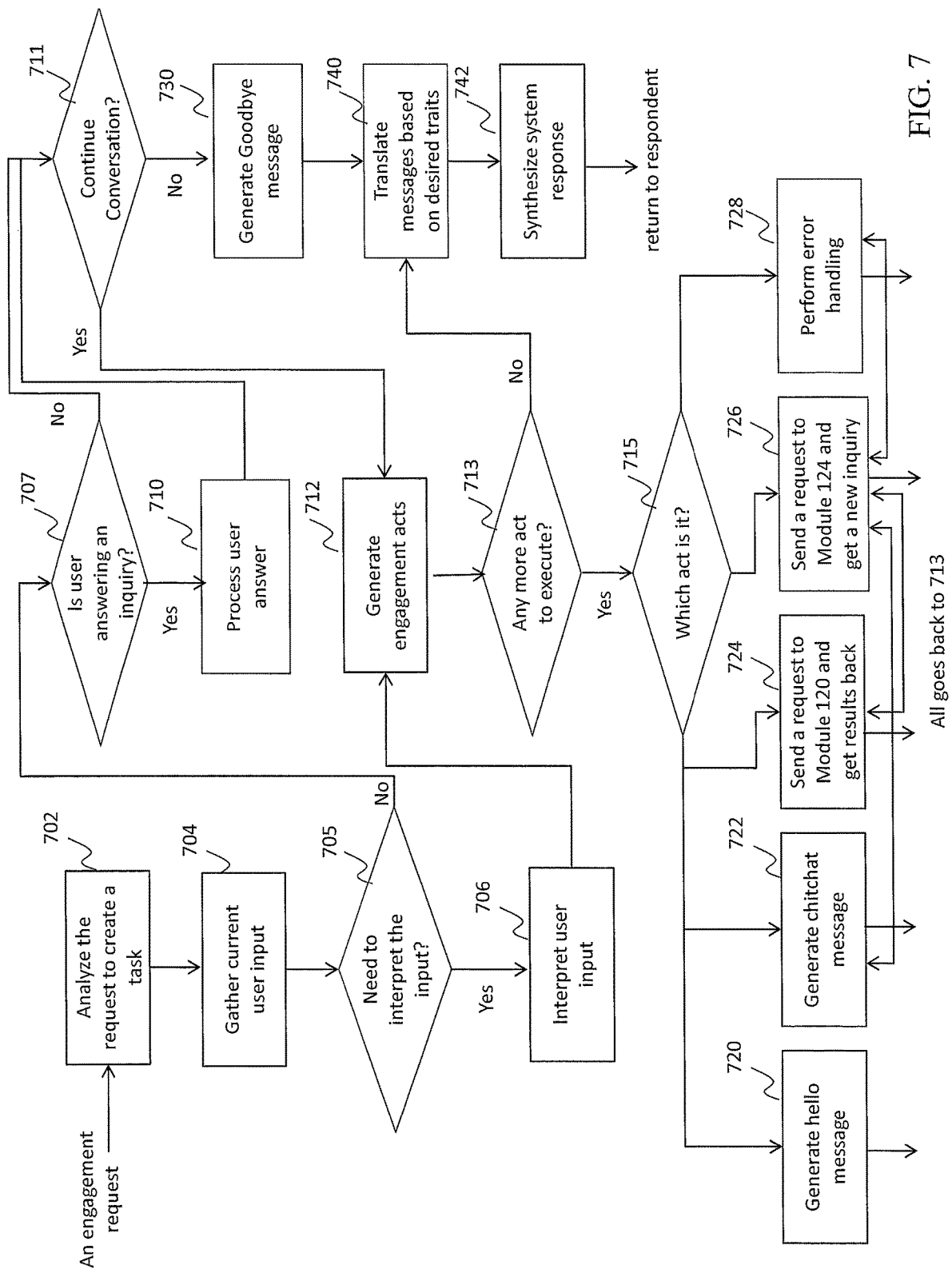
FIG. 7 is a flowchart of an exemplary process performed by a Trait-based Conversation Facilitator, according to an embodiment of the present teaching.

FIG. 7 is a flowchart of an exemplary process performed by module 122, according to an embodiment of the present teaching. FIG. 7 captures different process flows for processing different types of engagement request. Given an engagement request received, it is analyzed to create a corresponding engagement task at 702. Next is to gather all the current user input received at 704. The process then tests at 705 whether the current user input is meant to be interpreted. If it is, it moves on to interpret the user input at 706.

Based on the current engagement task and the interpretation results of the current user input, one or more engagement acts are suggested at 712. There are many approaches to suggest one or more engagement acts. One approach is an example-based approach, where each example captures an engagement scenario. One exemplary engagement scenario for starting a conversation includes two engagement acts: a greeting message and an initial inquiry. Another exemplary engagement scenario for starting a conversation may include different acts: a greeting message and inviting the user to ask a question. Deciding which acts to use is non-trivial, since such a decision is often influenced by many factors, including assessment goals, a user's characteristics, and the user's current input, which all are considered as context information for the conversation.

For example, an inquisitive user may prefer to ask more questions than just offer answers; while an easy-going person may not want to be pressed by questions after questions. To find a suitable example, each example in the present teaching is associated with one or more tags that indicate the suitable audience and situation. Based on the context information, the best matched example is retrieved at this step to suggest one or more engagement acts.

After one or more engagement acts are suggested, these acts are executed one by one through steps 713, 715, 720-728. The main steps 720-780 are described below.

Step 720 generates greeting expressions based on a greeting act. There are many approaches for generating greeting messages. One exemplary approach is to define a set of generic greeting templates, such as [hello, ?user-first-name], [hi, ?user-first-name]. Such templates are stored in the language dictionaries and rules 140-5 in the knowledge base 140. The bot may randomly choose a template and instantiate it with the user information. An improved, exemplary approach may be to define a set of more tailored greeting templates, such as [good morning, ?user-first-name] and [Happy Friday, ?user-first-name]. The bot then selects a template that best matches the context information, such as the time of the day (e.g., "good morning" vs. "good evening"), the user's greeting expression, or user's status (e.g., a new user vs. a returning user).

In addition to generating greeting messages in language, the bot may also use similar approaches to generate greeting messages in other modalities, such as facial expressions and body gestures. Templates that are used to generate such expressions may be stored in the visual language dictionaries and rules 140-6.

Step 722 generates one or more chitchat expressions based on a chitchat act. The approaches to creating chitchat expressions are quite similar to creating greeting expressions as it may use one or more general templates or situational templates. For example, one general type of chitchat message may be simple acknowledgements, while the other type may be topic switching. A number of factors, such as the characteristics of the current user input and the assessment status, are often used to decide which chitchat messages to generate. For example, it may decide to compliment a user after the user inputs a long message by responding "thanks for your thoughtful input". Alternatively, it may decide to invite the user to ask a question after the user has answered several inquiries.

Depending on the engagement context, a chitchat may be to ask the user a lighthearted question to cheer the user up or simply keep the user engaged. One or more rules may be used to help make such a decision. One exemplary rule may state that the bot ask a chitchat question to lighten up the situation if the user has just answered several serious questions in a row. Another exemplary rule may dictate that the bot ask a chitchat question about the user him/herself to keep the user engaged if the user appears to be self-centered. Yet another exemplary rule may state that the bot ask a humorous chitchat question to keep the user engaged if the user is fun loving. In such a case, it calls step 726, which then sends an inquiry-suggestion request to module 124.

Step 724 assesses the user. It may be invoked by the bot as part of engagement acts. For example, if the current user is a new user or an existing user but the previous engagement has been a while ago, this step may be invoked. Step 724 may also be invoked if the user input is explicitly asking for an assessment result, such as viewing his/her own personality assessment. An assessment request is generated at this step and sent to module 120 to obtain the asked assessment results.

Step 726 generates an inquiry-suggestion request and sends such a request to module 124 to obtain suggested inquiries.

Step 728 handles any possible errors occurred in an engagement. For example, if the current user input needs to be interpreted but cannot be interpreted by the bot, step 728 is invoked. Similarly, if the error-handling module decides to ask the user a clarification question as part of the error handling, it calls 726, which then requests a suggested inquiry from module 124. The error-handling module may handle one or more types of errors rising in an engagement. One exemplary case is that the bot cannot interpret a user input, while another is that the bot cannot recognize a user input as it is stated in a language other than English. Associated with each erroneous case, there is an error message. When the bot matches the current situation with one of the cases, it retrieves the corresponding error-handling message.

After all engagement acts are executed, the expressions generated by each module are now at step 740, which is responsible for translating these messages into personified expressions that project the bot's unique traits. There are one or more approaches to such translations.

One exemplary approach is to create one or more trait-based templates for each type of message. For example, to portray a warm, friendly personality, one or more templates may be defined to capture the type of questions such a personality would ask, including the questioning style, emoticons, and punctuations used. Here are two example templates: [really enjoying chatting w/you! May I ask you ?question], [love your input ☺ here is another one for you: ?question]. Such templates may be created based on human dialogues captured in dramas, novels, and TV shows, and indexed by the corresponding human characteristics that they reflect. Given a message (e.g., an inquiry), the translation process matches the message with one or more templates, and then selects the most suitable one to instantiate based on the context information about the conversation (e.g., the user made a simple inquiry vs. giving an elaborated comment).

Another exemplary approach to trait-based translation is to use a lexicon-based revision approach. Since it is well-known that certain word use reflects one's characteristics, this method is to inject such words into the intended messages so that they bear the desired human-like characteristics. One or more revision operators may be devised in such an approach. One operator is add that adds certain words or tokens (e.g., emoticons or punctuations) reflecting certain human characteristics into a message without changing the basic meaning of the message. For example, an add operator may add smiley emoticons or exclamation marks in a message to portray a cheerful, outgoing personality. On the opposite, a delete operator may be used to remove words or emoticons from a message without altering its meaning to keep the message simple and terse to portray a reserved personality. Another operator replace may replace existing words with alternative ones to better reflect desired characteristics. For example, replacing "I" with "we" to sound more friendly and collaborative.

While the template-based approach is simple but rigid, the lexicon-based revision approach is much more flexible but limited at manipulating a message only at its word level without the ability to alter the sentence structure. Yet another exemplary approach is to combine the two. It may use the lexicon-based revision approach first to translate a message, which is then matched with the existing templates to see if the message can be further translated. This is because through the first translation, the template-based approach may provide a better matching result. Moreover, the matched template and the message are then combined to create a new form of message, which may also become a new template for future use.

Various knowledge used in a translation process as described above, including the translation templates, translation operators, as well as the reverse lexicon that indicates the relationships between human traits and words or tokens are stored in the language dictionaries and rules 140-5 in the knowledge base 140.

According to the current embodiment of the present teaching, the translation occurs when all the messages are created. Alternatively, the translation may occur when creating a particular message, e.g., a greeting message. And the same exemplary approaches described above may be used. However, the current embodiment is preferred since the system better controls the translation effort by considering all the messages at the same time. For example, due to efficiency reason, the translator may decide not to translate every message because there are multiple messages to be communicated to the user at the same time.

The translated messages are then sent to step 742 to be packaged and communicated to the user. Since a bot's messages may include one or more parts, such as multiple sentences and accompanying visual presentations. This step decides how to coordinate such messages and communicate them to the user effectively. For example, in a text-based chat window, it may decide to break a multi-part message into multiple chunks instead of communicate it in one big long message. It may also pause between messages before communicating additional messages. Such decisions may be dictated by various human-engagement rules that are stored in the conversation etiquette 140-4.

In an alternative workflow where it is first determined at 705 the current user input does not need to be interpreted, the process moves on to check whether such an input is an answer to an inquiry at 707. If it is, the user input is then processed at 710. In this case, it first checks the content to detect any fowl or offensive words. If there is any, it attaches a red flag to the answer. In the meantime, it checks the respondent's assessed characteristics. If the inferred characteristics also raise a red flag, e.g., a very low conscientiousness, it may discard the answer or sends it to a human for further examination. Otherwise, it stores the answer in the database for future reuse. This step is necessary and important, since it helps prevent the recent embarrassment made by Microsoft's chatbot Tay, who had mindlessly learned the fowl, offensive language and content from irresponsible or malicious users.

If the user's input that does not require any interpretation and response, step 711 checks whether the bot should continue the engagement. In the present teaching, determining whether to continue the engagement may largely depend on a respondent's traits, although other factors, such as assessment status and the bot configuration, may also influence the decision. First, a respondent's traits help determine how long an effective engagement should be. For example, for an impatient person, an effective inquiry process should be kept short and focused, while for a reserved and thoughtful person, the inquiry process may be slow paced and last longer. Second, a respondent's traits may end an engagement, even though unsatisfactory assessment goals may require an engagement to continue. For example, prolonging an engagement with impatient, inattentive respondents may not be effective, let alone collecting quality information from them. For the same reasons, a respondent's traits may also end an engagement prematurely, even if a bot configuration may require the engagement to last for certain time.

If the process decides it should continue the engagement, it then goes to step 712 to generate one or more engagement acts, which will then start the next round of engagement. If the engagement should end, step 730 is then called to generate a farewell message. One or more approaches similar to the generation of greeting messages may be used to create a farewell message. The farewell message may be translated at step 740 to project the unique characteristics of the bot.

A special case which is not shown in this flow is that a message (e.g., a message from a human inquirer) is simply relayed to a respondent to support a direct interaction between two parties (an inquirer/administrator and a respondent).

Figure 8:
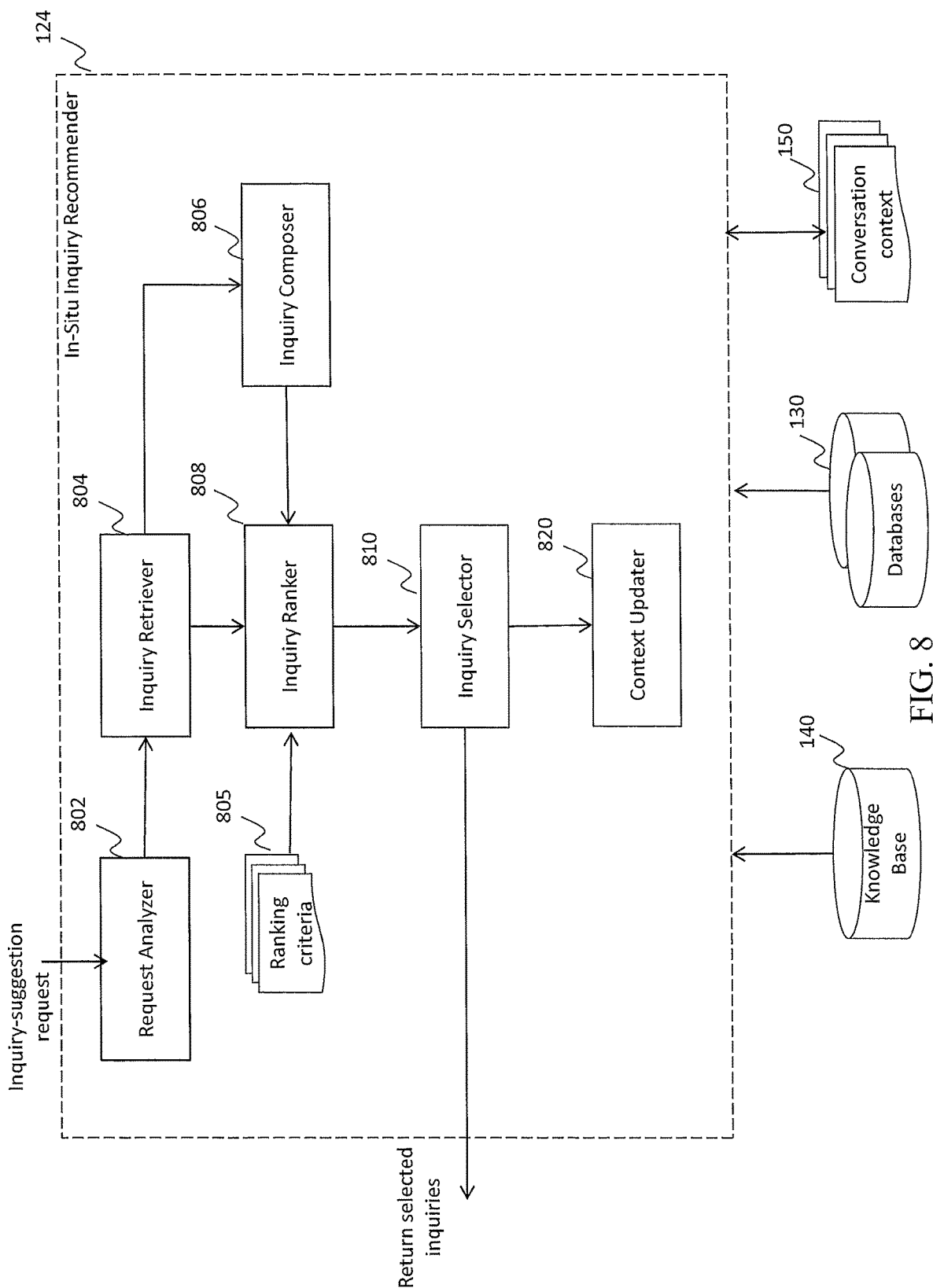
FIG. 8 illustrates an exemplary diagram of an In-Situ Inquiry Recommender, according to an embodiment of the present teaching.

FIG. 8 illustrates an exemplary diagram of an In-Situ Inquiry Recommender 124, according to an embodiment of the present teaching. The goal of this module is to suggest one or more inquiries based on the current engagement situation so the suggested inquiries may be used to continue the engagement.

FIG. 8 captures one of many structural embodiments for constructing an In-Situ Inquiry Recommender with one or more key components, although by no means the exemplary structural configuration of the components has exhausted all configuration variants, which may achieve the same or similar effects of facilitating an interactive inquiry and assessment process.

As shown in FIG. 8, it starts with an inquiry-suggestion request, which is generated for fulfilling one of many different purposes. Such a request may be automatically generated by a system or explicitly created by a human user, such as an inquirer 102-2 or an administrator 102-3. For example, the Trait-based Conversation Facilitator may request the suggestion of a chitchat question or an information inquiry. Similarly, an inquirer may request the suggestions of inquiries to continue her engagement with a respondent.

The request analyzer 802 first analyzes such a request. Based on the analysis, the inquiry retriever 804 retrieves one or more relevant inquiries from the knowledge base 140, in particular inquiry topics 140-3.

If no inquiries can be found, the inquiry composer 806 composes one or more inquiries from scratch based on the inquiry-suggestion request and the conversation context 150. No matter whether the inquiries are retrieved from the knowledge base or composed on the fly, they are ranked by the inquiry ranker 808 based on one or more ranking criteria 805. The inquiry selector 810 then chooses the top-N ranked inquiries per the original request and sends the selected inquiries back to the requester. The context updater 820 also updates the conversation context accordingly to indicate which inquiries have been recommended as well as stores the newly composed inquiries into the knowledge base 140 for future use.

Figure 9:
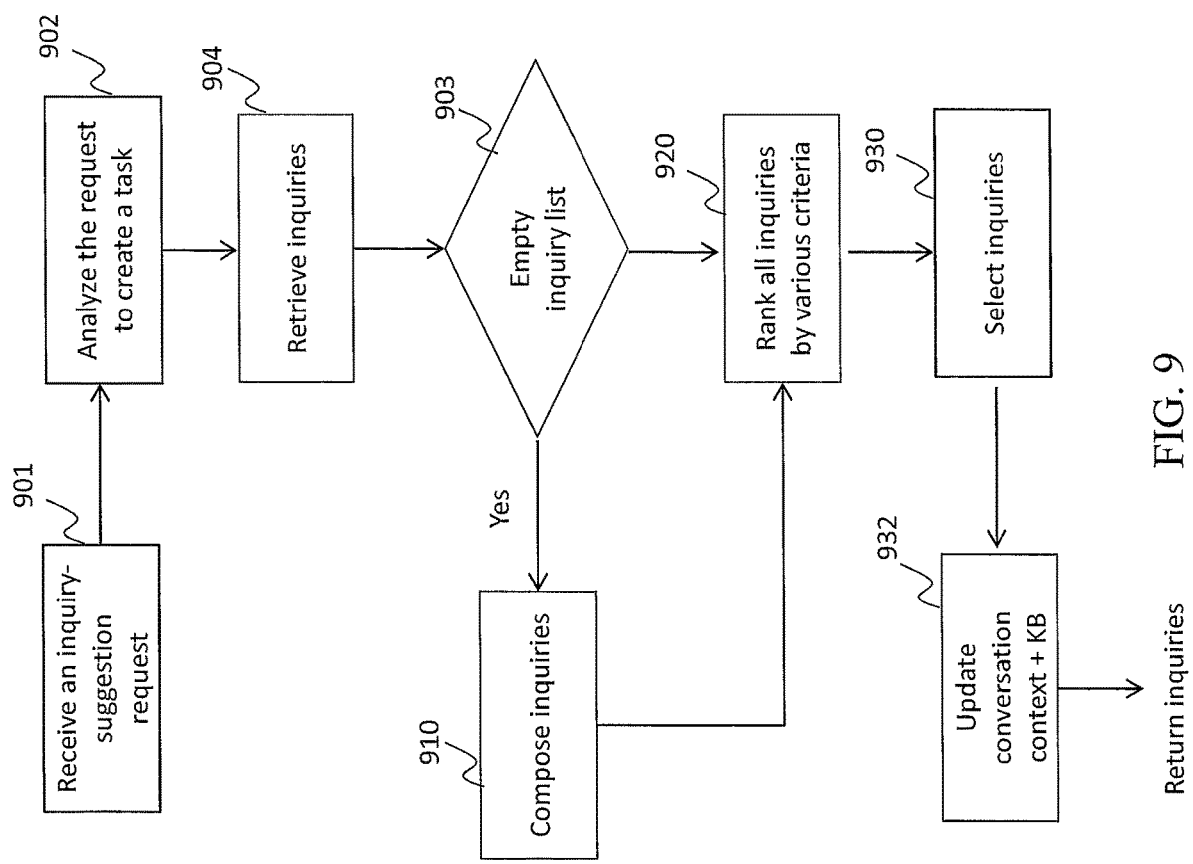
FIG. 9 is a flowchart of an exemplary process performed by an In-Situ Inquiry Recommender, according to an embodiment of the present teaching.

FIG. 9 is a flowchart of an exemplary process performed by module 124, according to an embodiment of the present teaching. Given an inquiry-suggestion request received at 901, it is analyzed to create a corresponding inquiry-recommendation task at 902. Based on this task, step 904 tries to retrieve one or more matched inquiries from the knowledge base 140. To facilitate inquiry retrieval, one or more inquiries are stored in a knowledge base. Each inquiry is also tagged with one or more labels.

For example, inquiry "How often do you have to stay up pass midnight to get your work done?" may be associated with the following tags: <type: trait-assessment> <trait-assessed: diligence> <answer-process: required> <difficulty: easy>. These tags indicate that this inquiry is intended for assessing the trait diligence, the answer to the inquiry needs to be processed, and it is relatively easy to process the user answer. Another exemplary inquiry, "Where do you often hang out with a group of friends?", may be associated with different tags: <type: chitchat> <audience: extrovert> <answer-processed: not-required> <difficulty: easy>. These tags specify that this is a chitchat inquiry for extrovert users, the answer is not required to be processed, and it is easy to handle the user answer. Yet in another example, inquiry "I sometimes lie if I have to", may be associated with tags: <type: trait-assessment> <trait-assessed: impression-management> <answer-process: required> <difficulty: easy> <follow-up-inquiry (follow-up-gen)>. Here it indicates that this inquiry has a follow-up inquiry, which will be automatically generated by function (follow-up-gen) after the parent inquiry is executed. This function uses one of the approaches described below to generate a follow-up inquiry.

At step 904, the retrieval is based on the type of inquiries requested, which is defined in the inquiry-suggestion request. For example, the Trait-based Conversation Facilitator may request a follow-up inquiry, or suggest an inquiry for assessment versus for chitchat purpose. It checks the type tag of an inquiry in the knowledge base. If the type matches the requested type, the inquiry is then retrieved. The retrieved inquiry is then checked against the conversation context 150 to see if it has already been used with this user in the current engagement. If it has and the inquiry is tagged as non-repeatable, it is then removed, since it does not make sense to repeat the same question in the same engagement.

If no inquiries can be used at this moment, it then calls 910 to generate one or more inquiries from scratch. Just like natural language generation, there are many approaches to automatically compose an inquiry. One exemplary approach is a template-based inquiry generation. For example, an exemplary template to generate one or more inquiries on a movie may be: [<head: who> <attributes: [director, producer, actor, actress, supporting actor, supporting actress]> <qualifier: favorite>]. Another exemplary template on food may be: [<head: what> <attributes: [cuisine, restaurant, chef, food magazine, Food TV show]> <qualifier: [favorite, least favorite]>].

Such a template may be used to generate many inquiry variants. For example, the first example template described above can generate at least 8 different inquiries (i.e., who is your favorite director/actor/ . . . ) about a movie, while the second template can generate at least 10 inquiries about food, without even counting the use of different verb tenses. This saves much knowledge engineering effort especially if human effort is required to code different inquiries in the knowledge base.

While a template-based approach like the one described above is quite efficient, it may limit the forms of inquiries to be generated. Another exemplary inquiry composition approach is an example-based inquiry generation approach, which is far more flexible. Such an approach composes a new inquiry using one or more existing inquiries or their compositions. Specifically, there is one or more inquiry examples stored in the knowledge base 140-5, such as "What is your favorite movie?" and "Where did you grow up?" First, the composer determines one or more concepts to inquire about. The composer may choose a concept that has never been discussed before or of which certain aspects have been discussed. There is one or more concepts and their relationships defined in the knowledge base 140-3, such as Book, Travel, and their associated concepts, such as book author and travel destination. Once a concept is determined, it then finds one or more inquiry examples that may be used to express inquiries about the concept. For example, if the selected concept is Book. By their semantic distance in the Wordnet, Book may be closer to the concept Movie than to Food. One or more inquiry examples that are used to inquire about Movie may be adopted to inquire about Book.

For example, a new inquiry "What is your favorite book" may be generated by adopting the example "What is your favorite movie". More sophisticated adoptions may rely on more complex inferences based on the semantic relationships among different concepts. For example, an inquiry example may be "Who is your favorite Oscar-Winning actor", a simple adoption of this inquiry on Book may not be appropriate: "Who is your favorite Oscar-Winning character". In such cases, the adopted examples must be revised. In the above example, a deletion operator may be used to remove the phrase "Oscar-Winning" since it is Movie-specific and not applicable to other concepts, such as Book. To facilitate the adoption of existing inquiry examples, each of which is often associated with one or more tags. In the above example, the phrase "Oscar-Winning" is tagged as Movie-specific, while the word "actor" is tagged with the concept Human. Based on these tags, the composer decides how to adopt the whole or parts of the example to generate a new inquiry. Moreover, two or more inquiry examples may be composed to form a new inquiry. For example, one or more examples on Food, such as "What is your favorite food" and "Why do you like Italian food", may be adopted and combined to compose a new inquiry on Drink "What is your favorite drink and why?" Such an adoption process may rely on composition rules stored in the knowledge base 140-5 to determine what can or cannot be composed.

Besides above approaches, an even more flexible approach is to automatically mine inquiries from corpora and associate the inquiries with one or more human traits. Assume that we have a person's conversational record, such as text messages or online chats. From such a record, we first identify and extract all the questions expressed by this person. We will then apply our Multimodal Assessor 120 to analyze the record and automatically extract the traits of this person. The extracted traits are then associated with the extracted questions. For the purpose of description, we use "linguistic data" to refer to such a conversational record, the inquiry templates, and the inquiry examples mentioned above.

To further improve the exemplary inquiry-generation approaches mentioned above, the composer considers a user's traits in such a process. In particular, each topic/entity in the knowledge base 140-3 is associated with one or more human traits. For example, the topic on Extreme Sports may be associated with human traits such as "adventurous" and "excitement-seeking", while the topics on Music and Design are associated with human traits such as "artistic" and "open-minded". Similarly, each inquiry template or example as described above and stored in the knowledge base 140-5 is also associated with one or more human traits to indicate how it appeals to people with different characteristics. Based on the assessed characteristics of the current user and the trait-tags of the inquiry templates and examples, the above exemplary inquiry-generation approaches are then augmented to select and adopt the best matched templates or examples to compose one or more new inquiries. As a result, the generated new inquiries appeal to the current user's unique characteristics, such as his/her personality, motivation, and interests, which has never been achieved before.

To even further improve inquiry generation, no matter which approach described above is used, it is desirable to take into account the context information that is characterized by one or more factors, such as the mood of the user (e.g., frustrated and excited), quality of user answer (thoughtful vs. conflicting vs. out-of-bounds), relevance of user answer (how relevant it is to the current inquiry), and type of user answer (e.g., question vs. direct answer). For example, function (follow-up-gen) mentioned earlier generates a follow-up inquiry to the inquiry "Are you sometimes tell lies when you have to". Assume that the user's answer is "never" and this user is an achievement-driving person. Since the answer is considered out of bounds, an intervention inquiry will be generated, such as "Hmmm . . . interesting answer, are you sure about it? I know you want to show your best side but it may not always help. Do you wish to keep it or resubmit one?" To generate such an inquiry, (follow-up-gen) evaluates various conditions-query pairs. For example, [<followup: intervention-template> <conditions: [(out-of-bounds ?user-input) (match-traits ?user-trait)]>]. Moreover, the context also affects the expressions of inquiries since such expressions must be adapted by context. For example, through the use of revision operators, a replacement operator uses a pronoun "it" in the inquiry.

If two and more inquiries reach step 920, all the inquiries are then ranked based on one or more criteria. Overall, the following formula may be used to compute the rank of an inquiry based on one or more criteria:

$$R(q)=\Sigma_i^N w_i \times \Sigma_j^M (1-\text{dist}(\text{val}_j(q),\text{val}_j(c))).$$

Here R(q) computes the rank of inquiry q, N is the total number of criteria to be evaluated, $w_i$ is the weight of the ith criterion, M is the total number of aspects to be evaluated for the ith criterion, dist( ) is a distance function that computes how well different aspects of inquiry q matches with that of conversation context c, and function $val_j$( ) computes the corresponding value of q or c for the jth aspect of ith criterion.

One exemplary criterion is relevance, which ensures that an inquiry match the conversation context 150. Such a criterion may involve the evaluation of one or more aspects, including a user's characteristics, the current user input, the assessment status, and the ability of the bot to handling user input to the inquiry. To evaluate how well an inquiry matches the current user's characteristics, it computes the distance between val(q) and val(c). In this case, val(q) retrieves the value associated with the audience tag of q, while val(c) retrieves the assessed characteristics of the current user. As an example, if the current user is an extrovert, the chitchat inquiry mentioned above "Where do you often hang out with a group of friends?" matches him better than the inquiry "What do you like to read?"

To evaluate how well an inquiry matches the recent conversation, the dist( ) function measures the semantic distance between a suggested inquiries and the user input in the last turn of conversation. For example, if the user was just commenting on his/her hobbies, inquiries such as "What are your favorite weekend activities" may be closer to such a context than inquiries like "What's your favorite season".

To evaluate how well an inquiry helps accomplish one or more assessment goals, val(q) checks the assessment-related tags of an inquiry to see which traits can be assessed, while val(c) checks the current assessment status and retrieves which traits yet to be assessed. The better matched the two are, the inquiry is ranked higher. For example, if one of the goals is to assess the diligence of the user. If the assessment goal is yet to be achieved, the inquiries used to assess this trait, such as "How often do you have to stay up past midnight to finish up your work?", are ranked higher.

Another exemplary criterion is diversity, which requires the bot diversify the type of inquiries used in its engagement with a user. In this case, it ranks inquiries that are different from the ones already used higher. Yet another exemplary criterion is easiness. Per the difficulty tag associated with each inquiry, inquiries that are easier for the bot to handle are also ranked higher. This is because it is easier for the bot to continue engaging with a user on such topics without stumbling on it.

In short, step 920 ranks all the inquiries based on one or more criteria, each of which evaluates one or more aspects. The ranked inquiries are then sent to step 930, which selects the top-N ranked inquiries. Here the parameter N is often specified in the original inquiry-suggestion request. Before returning the suggested inquiries to the requester, the process also updates the conversation context 150 to indicate what inquiries are suggested and/or the knowledge base 140 to store newly generated inquiries, accordingly.

Figure 10:
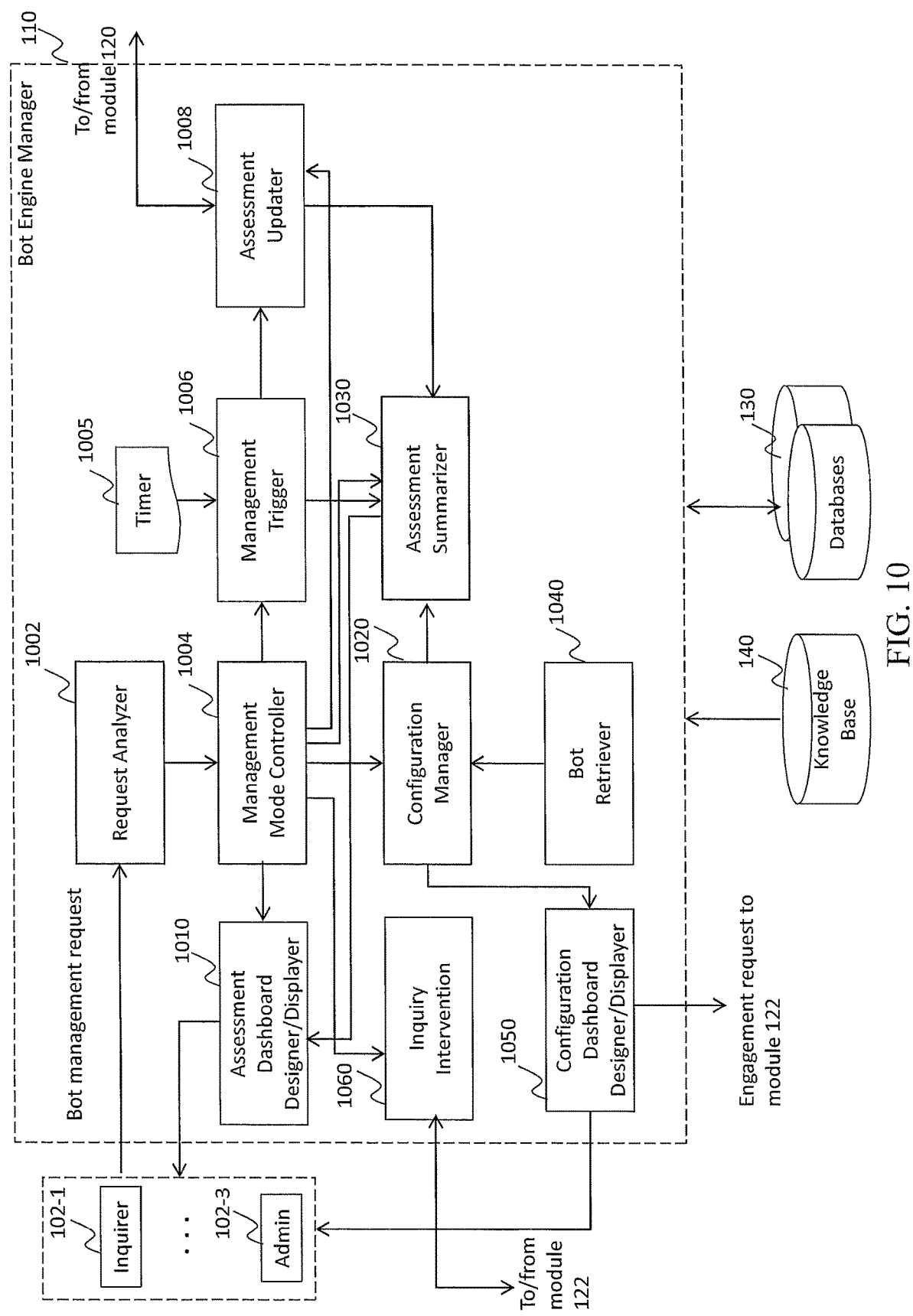
FIG. 10 illustrates an exemplary diagram of a Bot Engine Manager, according to an embodiment of the present teaching.

FIG. 10 illustrates an exemplary diagram of a Bot Engine Manager 110, according to an embodiment of the present teaching. The goal of this module is to manage the Bot Engine 106 and use the engine to perform one or more functions related to interactive inquiry and assessment.

FIG. 10 captures one of many structural embodiments for constructing a Bot Engine Manager with one or more key components, although by no means the exemplary structural configuration of the components has exhausted all configuration variants, which may achieve the same or similar effects of facilitating an interactive inquiry and assessment process. The Bot Engine Manager may be configured with one or more key components to handle one or more bot engine management tasks.

As shown in FIG. 10, the input to the manager 110 is a bot engine management request. A human user may issue such a request. Here a human user may be one or more persons who perform different roles in an interactive inquiry and assessment process, such as an inquirer 102-2 and a system administrator 102-3. The issue of such requests may be explicitly done by a human being via one or more computer interfaces, such as a GUI or a script. The request may be a one-time request or an scheduled request that is issued periodically and triggered by a timer. A request is first processed by a request analyzer 802 to create a corresponding management task. The task is then dispatched by a controller 804 based on the type of the request as well as timing of the request.

One exemplary management task is to obtain up-to-date assessment results. In this case, the assessment updater 1008 formulates one or more assessment requests, which are then sent to the Multimodal Assessor 120. Based on the request, Module 120 automatically assesses the information collected and/or the respondents involved, and return the assessment results. The returned results are then sent to the assessment summarizer 1030 to be summarized. The summarized results are then sent to module 1010 to be visualized and displayed.

Another exemplary management task is to obtain summaries of current assessment results. In this case, the request is forwarded to the assessment summarizer, which retrieves the existing assessment results cached in the databases 130-3 and generates one or more summaries. The summaries are then sent to module 1010 to be visualized and displayed.

Yet another management task is to configure a bot for performing interactive inquiry and assessment. In this case, a user may configure a brand new bot from scratch or reconfigure an existing bot. To configure a brand new bot, the user may define one or more properties of the bot, such as but not limited to the inquiries to be used, the human-like characteristics of the bot, as well as the time required for each inquiry session.

Since it is often easier to reconfigure an existing bot, the bot retriever may first be called to retrieve one or more bots from the databases 130-1 based on the retrieval criteria defined in the management task. For example, if a user wants to configure a new bot for conducting interviews with job applicants, one or more job interview bots may be retrieved. In contrast, if one wants to configure a new bot for conducting marketing research on consumer products, one or more marketing survey bots may be retrieved. Each of such bots may be associated with a set of unique human-like characteristics, a set of intended inquiries, and the required timing for each engagement session. The user may just reuse one of the retrieved bots without any changes or customize it to suit a specific inquiry situation, such as modifying the inquiries to be used. The user may also reconfigure other attributes of the bot, such as its name, gender, and even the "appearance" (e.g., profile photo).

Another exemplary management task is to perform one or more management tasks periodically. In this case, a management trigger 1006 associated with a timer 1005 triggers different functional units to perform a scheduled management task. One such task may be to obtain updated assessment results as described above. Another scheduled task may be to obtain one or more summaries of assessment results 1030 as described above.

Yet another exemplary management task is for a human inquirer or administrator to intervene during an inquiry process 1060. This is especially useful especially in situations that are difficult for bots to handle. For example, during an inquiry, a user suddenly gets very agitated, and a human inquirer is alerted. In such a case, the human inquirer jumps in to calm the user down based on the user's inferred traits and the conversation context before handling the control back to the bot.

Figure 11:
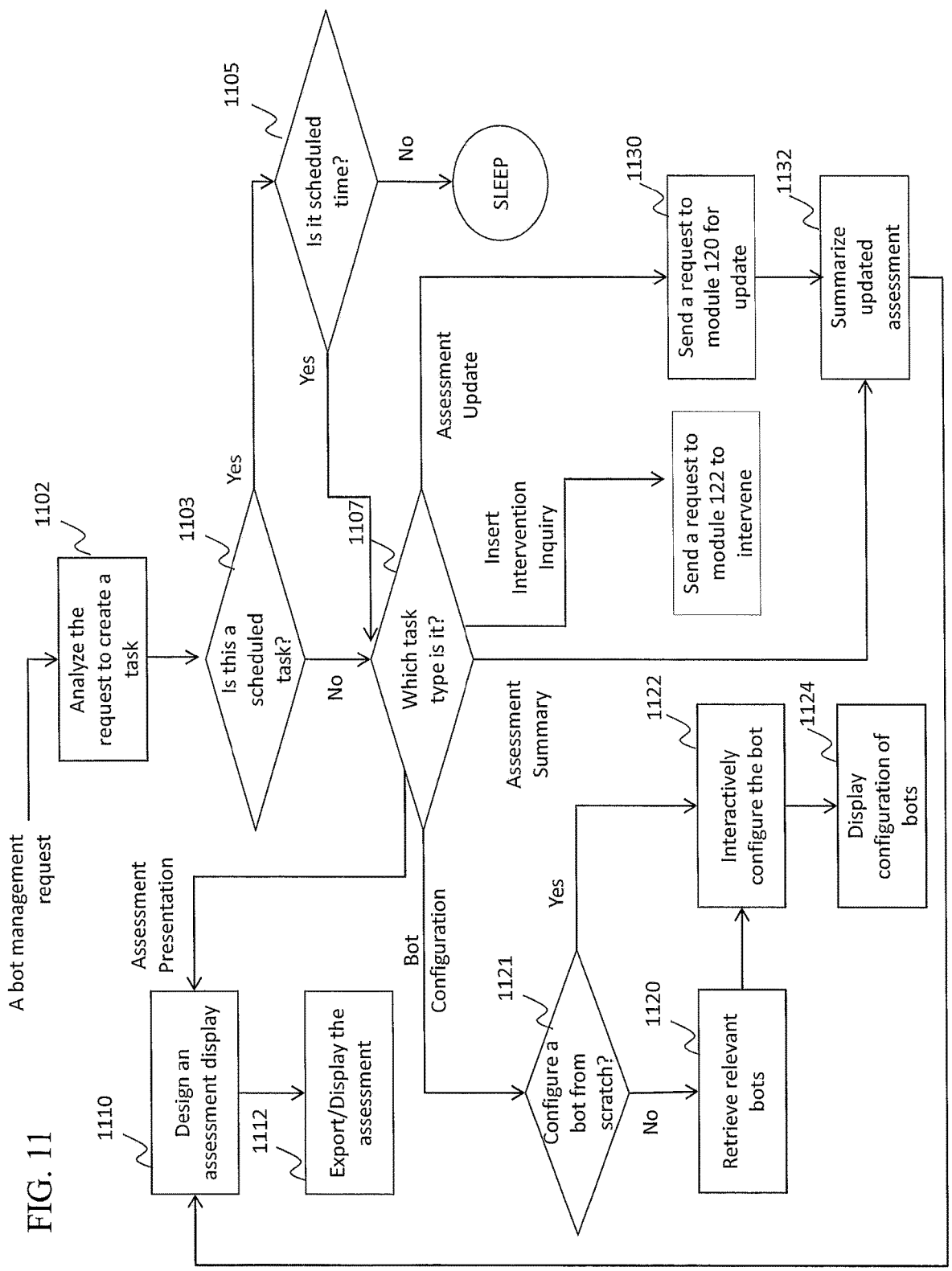
FIG. 11 is a flowchart of an exemplary process performed by a Bot Engine Manager, according to an embodiment of the present teaching.

FIG. 11 is a flowchart of an exemplary process performed by a Bot Engine Manager, according to an embodiment of the present teaching. FIG. 11 captures one or more process flows as how the Bot Engine Manager handles bot engine management requests. Starting with a bot engine management request received at 1102, the request is first processed and a corresponding management task is created. Per the task description, the process first checks whether the management task is a scheduled task at 1103. If it is not, it then checks the type of task at 1107

If the type of the task is to intervene the current process, the human inquirer sends an intervention request directly to module 122 for further processing.

If the type of the task is to present the current assessment results, the presentation is then composed at 1110. The presentation may be displayed or exported (e.g., as a PDF or JPEG) at 1112.

If the task is to obtain updated assessment results, an assessment request is then generated at 1130, and the request is then sent to module 120 to obtain updated assessment results. The returned results are sent to be summarized at 1132. The presentation of the summarized results is then composed at 1110. The presentation may be displayed or exported (e.g., as a PDF or JPEG) at 1112.

If the task is to obtain summaries of existing assessment results, one or more summaries are then generated at 1132, and a presentation of such summaries is composed at 1110. The presentation may be displayed or exported (e.g., as a PDF or JPEG) at 1112.

If the task is to configure a bot for interactive inquiry and assessment, it first checks whether the user wants to configure a bot from scratch at 1121. If it is not, one or more bots are retrieved from the databases 130 at step 1120. The user then selects and/or configures one of the retrieved bots via one or more user interfaces (e.g., a GUI or a script) at 1122. If one decides to configure a bot from scratch, s/he also uses one or more user interfaces to configure the properties of a new bot at step 1122. The configured bot is then displayed at 1124. It may also be displayed along with other bots that the user or others has configured or used.

If the task is a scheduled task, it then checks whether now is the scheduled time at 1105. If it is not, the process sleeps until the scheduled time. Otherwise, it checks the type of task at 1107 and follows the flow as described above. Details on a couple of complex steps are provided below.

Step 1110 takes one or more information summaries as its input and outputs one or more information graphics that encode the summaries. One or more approaches may be used to implement the content determination process. One exemplary approach is a template-based approach. In such an approach, one or more design templates are defined. For example, one template may specify an information graphic that encodes a summary of collected opinions by their polarity (negative and positive) per facet (e.g., product feature 1 and product feature 2). Another template, on the other hand, may define an information graphic that encodes the respondents by the polarity of their opinions, inferred traits, and demographics.

It is most likely that such templates be domain dependent. For example, a template for presenting a summary of marketing research results may be quite different from one that visualizes a summary of job applicant assessment results.

The goal of step 1132 is to summarize the assessment results. As mentioned earlier, broadly, there are two types of assessments, information assessment and respondent assessment. Information assessment further comprises information summarization and information quality assessment. While information summarization may depend on the type of information being collected, such as marketing research vs. patient status, different data analysis and summarization approaches may be used. For example, for structured data, including numeric data, data mining methods such as clustering may be used to find patterns in the collected data and produce a summary. On the other hand, for unstructured data such as free text, text analytics may be used to mine the text and create meaningful summaries, such as extracting various topics from the text or identifying sentiment from the text. More importantly, in the present teaching, it also summarizes the quality of collected information based on the respondents' inferred traits. Such a summary may outline the quality of collected data from one or more aspects, including the respondents' characteristics in general (e.g., reliability) the respondents' characteristics when responding to certain inquiries (e.g., response time), the volume of data collected, and the distribution of the data collected.

To summarize respondent assessment, this step may use one or more approaches. One exemplary approach is to summarize the assessment by trait. Here each trait is defined by an inquirer or administrator (e.g., assessing three traits of job candidates) or by default based on the assessment task (e.g., assessing 5 traits of customers in a marketing research task). In this approach, a summary may show the top-N respondents by each trait as well as highlight those that are ranked high by all three traits. Another exemplary approach is to cluster the respondents by their inferred characteristics to identify distinct groups by their shared traits. This approach allows an inquirer to see the patterns among respondents by their characteristics, which then may be used to guide future assessment. Assume that a marketing research assessment discovers three distinct groups of customers who have voiced very polarized views on a product. The equal number of people belonging to each of the three groups should perhaps be invited to participate in future marketing research to offer a balanced view.

Because the Bot Engine Manager 110 allows periodical assessment and the display of such assessment results, a human user can obtain an incremental, in progress view of an interactive inquiry and assessment process. Such a capability also directly benefits a human inquirer, who may dynamically decide how to best handle an inquiry process. For example, a law enforcement officer may use such information during an inquiry process with a suspect or witness to collect needed information more effectively. In such cases, their verbal exchanges or non-verbal behavior may be used to assess a respondent's characteristics. In short, the intelligence possessed by the Bot Engine 106 not only benefit a human-computer but also a human-human interactive inquiry and assessment process.

Figure 12:
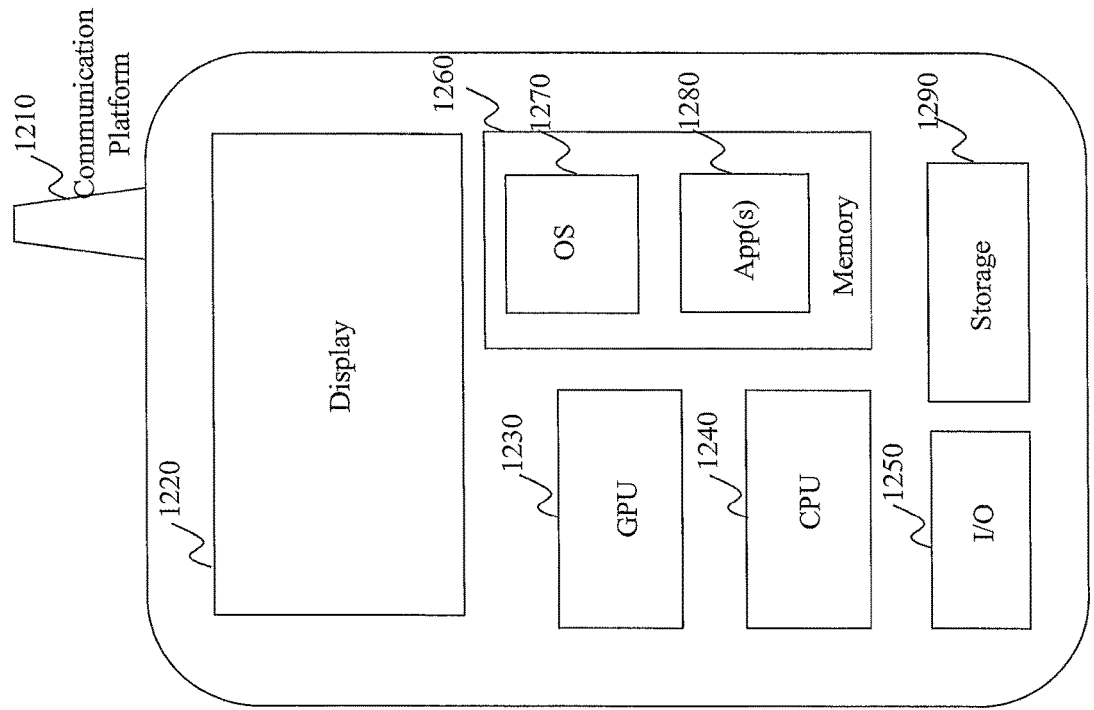
FIG. 12 depicts the architecture of a mobile device which can be used to implement a specialized system incorporating the present teaching.

FIG. 12 depicts the architecture of a mobile device that can be used to realize a specialized system implementing the present teaching. In this example, the user device on which an interactive inquiry and assessment is requested and received is a mobile device 1200, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1200 in this example includes one or more central processing units (CPUs) 1240, one or more graphic processing units (GPUs) 1230, a display 1220, a memory 1260, a communication platform 1210, such as a wireless communication module, storage 1290, and one or more input/output (I/O) devices 1250. Any other suitable component, including but not limited to a system bus or a controller (not shown), may also be included in the mobile device 1000. As shown in FIG. 12, a mobile operating system 1270, e.g., iOS, Android, Windows Phone, etc., and one or more applications 1280 may be loaded into the memory 1260 from the storage 1290 in order to be executed by the CPU 1240. The applications 1280 may include a browser or any other suitable mobile apps for characterizing a user's reputation on the mobile device 1200. User interactions with the information about characterizing a user's reputation may be achieved via the I/O devices 1250 and provided to the Engagement Facilitation System 106 and/or other components of systems disclosed herein.

To implement various modules, units, and their functionalities described in the present disclosure, computer hardware platforms may be used as the hardware platform(s) for one or more of the elements described herein (e.g., the Bot Engine 106 and/or other components of systems described with respect to FIGS. 1-11). The hardware elements, operating systems and programming languages of such computers are conventional in nature, and it is presumed that those skilled in the art are adequately familiar therewith to adapt those technologies to characterize a user's reputation as described herein. A computer with user interface elements may be used to implement a personal computer (PC) or other type of workstation or terminal device, although a computer may also act as a server if appropriately programmed. It is believed that those skilled in the art are familiar with the structure, programming and general operation of such computer equipment and as a result the drawings should be self-explanatory.

Figure 13:
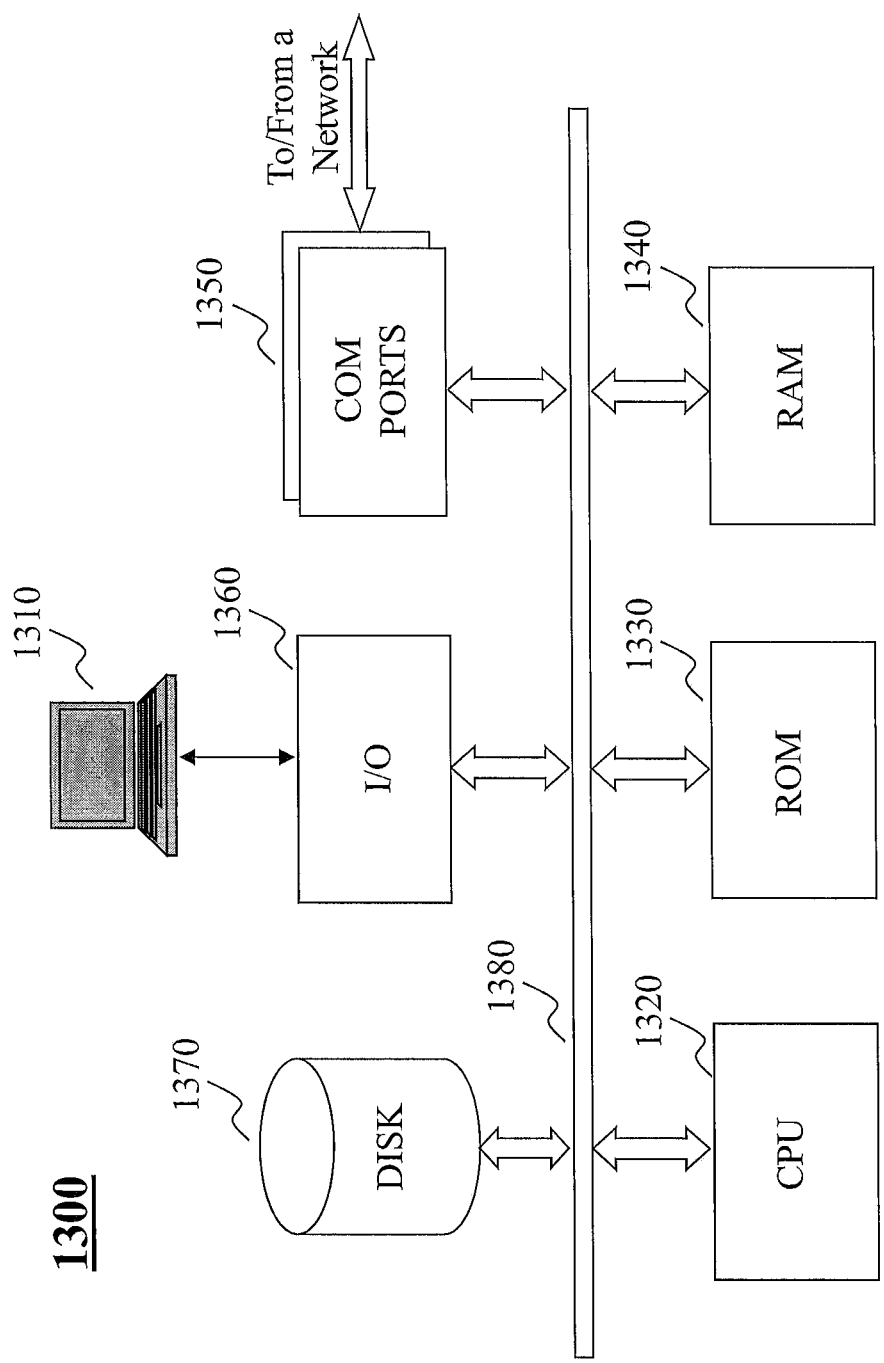
FIG. 13 depicts the architecture of a computer that can be used to implement a specialized system incorporating the present teaching.

FIG. 13 depicts the architecture of a computing device that can be used to realize a specialized system implementing the present teaching. Such a specialized system incorporating the present teaching has a functional block diagram illustration of a hardware platform that includes user interface elements. The computer may be a general-purpose computer or a special purpose computer. Both can be used to implement a specialized system for the present teaching. This computer 1300 may be used to implement any component of the techniques for characterizing a user's reputation, as described herein. For example, the Bot Engine 106, etc., may be implemented on a computer such as computer 1300, via its hardware, software program, firmware, or a combination thereof. Although only one such computer is shown, for convenience, the computer functions relating to characterizing a user's reputation as described herein may be implemented in a distributed fashion on a number of similar platforms, to distribute the processing load.

The computer 1300, for example, includes COM ports 1350 connected to and from a network connected thereto to facilitate data communications. The computer 1300 also includes a central processing unit (CPU) 1320, in the form of one or more processors, for executing program instructions. The exemplary computer platform includes an internal communication bus 1310, program storage and data storage of different forms, e.g., disk 1370, read only memory (ROM) 1330, or random access memory (RAM) 1340, for various data files to be processed and/or communicated by the computer, as well as possibly program instructions to be executed by the CPU. The computer 1300 also includes an I/O component 1360, supporting input/output flows between the computer and other components therein such as user interface elements 1380. The computer 1300 may also receive programming and data via network communications.

Hence, aspects of the methods of creating and using a bot for interactive inquiry and assessment, as outlined above, may be embodied in programming. Program aspects of the technology may be thought of as "products" or "articles of manufacture" typically in the form of executable code and/or associated data that is carried on or embodied in a type of machine-readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Figure 14:
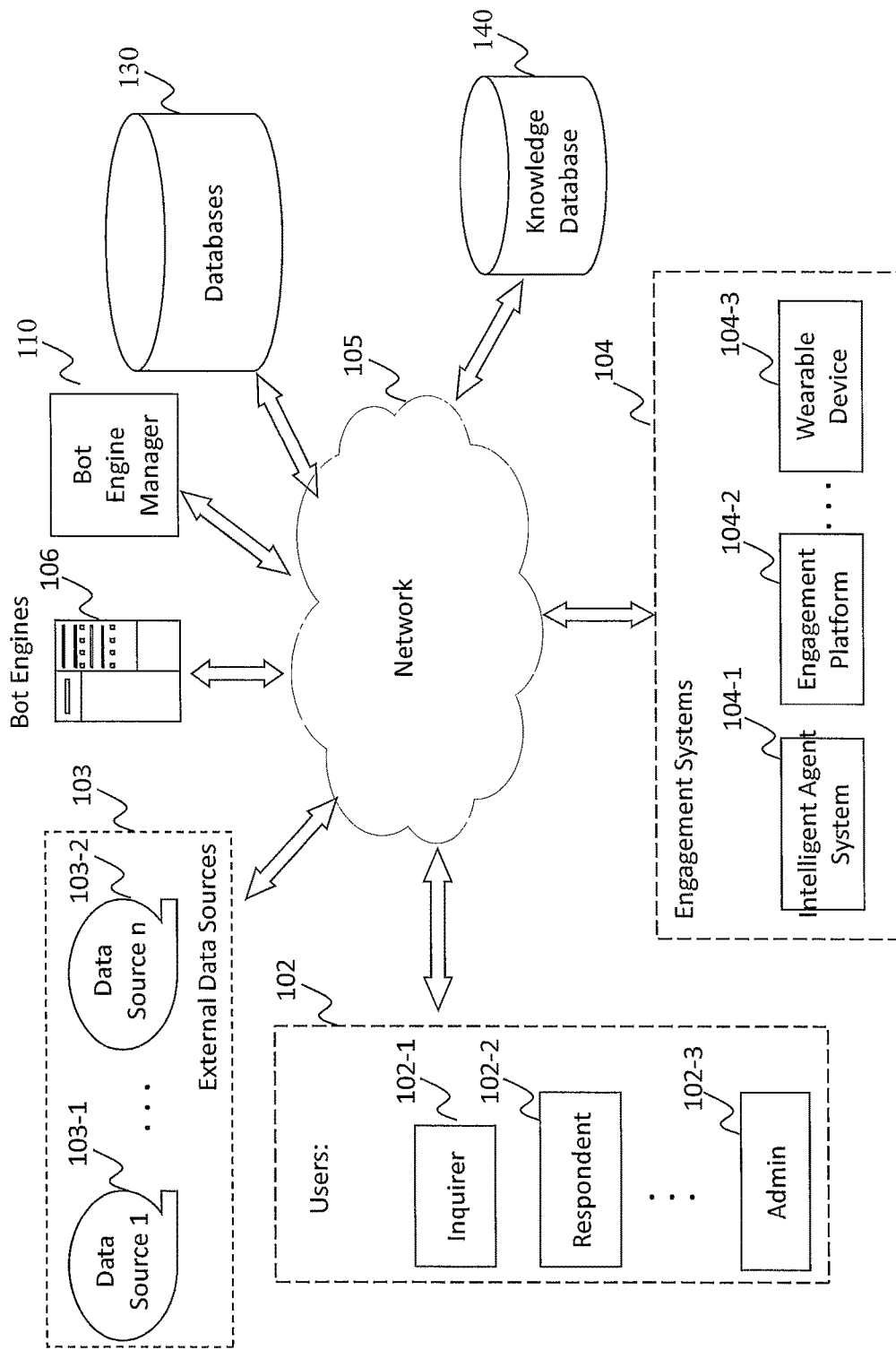
FIG. 14 is a high level depiction of an exemplary networked environment for facilitating engagement, according to an embodiment of the present teaching.

FIG. 14 is a high level depiction of an exemplary networked environment 1400 for interactive inquiry and assessment, according to an embodiment of the present teaching. In FIG. 14, the exemplary networked environment 1400 includes one or more users 102, a network 105, a bot engine 106, a bot engine manager 110, databases 130, a knowledge database 140, engagement systems 104 which includes one or more systems, and data sources 103. The network 105 may be a single network or a combination of different networks. For example, the network 105 may be a local area network (LAN), a wide area network (WAN), a public network, a private network, a proprietary network, a Public Telephone Switched Network (PSTN), a wireless network, a virtual network, the Internet, or any combination thereof.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, characterizing a user's reputation as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network for obtaining qualitative information from a user via a bot, comprising:
    obtaining a request to collect information in connection with a user;
    generating a statement to be expressed to the user for facilitating a conversation between the user and the bot based on the request;
    guiding the conversation between the user and the bot by:
        receiving qualitative information in connection with the user, collected during the conversation, wherein the collected qualitative information characterizes the user in a plurality of modalities,
        automatically analyzing the collected qualitative information in the plurality of modalities to obtain an assessment of one or more human psychological traits of the user,
        automatically composing one or more subsequent statements based on the one or more human psychological traits of the user and a quality of the assessment,
        evaluating the one or more subsequent statements based on a plurality of criteria, wherein at least one criterion computes a distance between each of the one or more subsequent statements and the assessment of one or more human psychological traits of the user,
        ranking the one or more subsequent statements based on the evaluation, and
        selecting, based on the ranking, a subsequent statement from the one or more subsequent statements to be expressed to the user;
    transforming the collected qualitative information in the plurality of modalities and the assessment into a plurality of result summaries; and
    providing, in response to the request, the plurality of result summaries to at least one user.

2. The method of claim 1, wherein the plurality of modalities comprises at least one of:
    one or more patterns determined based on activities of the user;
    one or more behaviors of the user during interactions between the user and the bot; and
    one or more answers of the user in response to the one or more subsequent statements belonging to a specific type.

3. The method of claim 1, wherein automatically composing the one or more subsequent statements further comprises:
   determining one or more human psychological traits of the bot; and
   automatically translating the one or more subsequent statements into one or more personified statements that reflect the one or more human traits of the bot.

4. The method of claim 1, wherein automatically composing the one or more subsequent statements further comprises:
   automatically synthesizing one or more inquiries related to the one or more human psychological traits; and
   automatically recommending at least one of the one or more synthesized inquiries based on the assessment of the one or more human psychological traits of the user.

5. The method of claim 1, wherein automatically composing the one or more subsequent statements further comprises:
   obtaining one or more pieces of linguistic data related to the one or more human psychological traits; and
   automatically synthesizing one or more inquiries based on the one or more pieces of linguistic data and the assessment of the one or more human psychological traits of the user.

6. The method of claim 1, wherein selecting the subsequent statement further comprises:
   presenting the one or more subsequent statements and the result summaries to a human inquirer; and
   receiving the subsequent statement selected by the human inquirer.

7. The method of claim 1, wherein automatically composing the one or more subsequent statements further comprises:
   presenting the result summaries to a human inquirer; and
   automatically synthesizing one or more statements based on an input from the human inquirer.

8. The method of claim 1, wherein transforming the collected qualitative information further comprises:
   determining one or more properties of the collected qualitative information based on the assessment of one or more human psychological traits of the user; and
   including the one or more properties of the collected qualitative information as at least a part of the result summaries.

9. The method of claim 1, wherein transforming the collected qualitative information further comprises:
   generating a conversation meter that dynamically monitors the one or more human psychological traits of the user based on the assessment during the conversation; and
   including the conversation meter as at least a part of the result summaries.

10. The method of claim 1, wherein a criterion corresponds to a diversity of the automatically composed one or more statements.

11. The method of claim 1, further comprising:
    merging the assessed two or more human psychological traits of the user based on data sources from which each of the traits is inferred.

12. A system, having at least one processor, storage, and a communication platform connected to a network for obtaining qualitative information from a user via a bot, comprising:
    a bot engine manager implemented by the at least one processor and configured for obtaining and managing a request to collect qualitative information in connection with a user;
    a trait-based conversation facilitator implemented by the at least one processor and configured for generating a statement to be expressed to the user for facilitating a conversation between the user and the bot based on the request; and
    a bot engine implemented by the at least one processor and configured for guiding the conversation between the user and the bot by:
       receiving qualitative information in connection with the user, collected during the conversation, wherein the collected qualitative information characterizes the user in a plurality of modalities,
       automatically analyzing the collected qualitative information in the plurality of modalities to obtain an assessment of one or more human psychological traits of the user,
       automatically composing one or more subsequent statements based on the one or more human psychological traits of the user and a quality of the assessment,
       evaluating the one or more subsequent statements based on a plurality of criteria, wherein at least one criterion computes a distance between each of the one or more subsequent statements and the assessment of one or more human psychological traits of the user,
       ranking the one or more subsequent statements based on the evaluation, and
       selecting, based on the ranking, a subsequent statement from the one or more subsequent statements to be expressed to the user, and
    wherein the bot engine manager is further configured for
       transforming the collected qualitative information in the plurality of modalities and the assessment into a plurality of result summaries, and
       providing, in response to the request, the plurality of result summaries to at least one user.

13. The system of claim 12, wherein the plurality of modalities comprises at least one of:
    one or more patterns determined based on activities of the user;
    one or more behaviors of the user during interactions between the user and the bot; and
    one or more answers of the user in response to the one or more subsequent statements belonging to a specific type.

14. The system of claim 12, wherein automatically composing the one or more subsequent statements further comprises:
    determining one or more human psychological traits of the bot; and
    automatically translating the one or more subsequent statements into one or more personified statements that reflect the one or more human traits of the bot.

15. The system of claim 12, wherein automatically composing the one or more subsequent statements further comprises:
    automatically synthesizing one or more inquiries related to the one or more human psychological traits; and
    automatically recommending at least one of the one or more synthesized inquiries based on the assessment of the one or more human psychological traits of the user.

16. The system of claim 12, wherein automatically composing the one or more subsequent statements further comprises:
obtaining one or more pieces of linguistic data related to the one or more human psychological traits; and
automatically synthesizing one or more inquiries based on the one or more pieces of linguistic data and the assessment of the one or more human psychological traits of the user.

17. The system of claim 12, wherein selecting the subsequent statement further comprises:
presenting the one or more subsequent statements and the result summaries to a human inquirer; and
receiving the subsequent statement selected by the human inquirer.

18. The system of claim 12, automatically composing the one or more subsequent statements further comprises:
presenting the result summaries to a human inquirer; and
automatically synthesizing one or more statements based on an input from the human inquirer.

19. The system of claim 12, wherein transforming the collected qualitative information further comprises:
determining one or more properties of the collected qualitative information based on the assessment of one or more human psychological traits of the user;
generating a conversation meter that dynamically monitors the one or more human psychological traits of the user based on the assessment during the conversation; and
including, as at least a part of the result summaries, at least one of the conversation meter and the one or more properties of the collected qualitative information.

20. A non-transitory machine-readable medium having information recorded thereon for obtaining qualitative information from a user via a bot, wherein the information, when read by the machine, causes the machine to perform the following:
obtaining a request to collect information in connection with a user;
generating a statement to be expressed to the user for facilitating a conversation between the user and the bot based on the request;
guiding the conversation between the user and the bot by:
receiving qualitative information in connection with the user, collected during the conversation, wherein the collected qualitative information characterizes the user in a plurality of modalities,
automatically analyzing the collected qualitative information in the plurality of modalities to obtain an assessment of one or more human psychological traits of the user,
automatically composing one or more subsequent statements based on the one or more human psychological traits of the user and a quality of the assessment,
evaluating the one or more subsequent statements based on a plurality of criteria, wherein at least one criterion computes a distance between each of the one or more subsequent statements and the assessment of one or more human psychological traits of the user,
ranking the one or more subsequent statements based on the evaluation, and
selecting, based on the ranking, a subsequent statement from the one or more subsequent statements to be expressed to the user;
transforming the collected qualitative information in the plurality of modalities and the assessment into a plurality of result summaries; and
providing, in response to the request, the plurality of result summaries to at least one user.

* * * * *